United States Patent
Lee et al.

(10) Patent No.: US 11,463,295 B2
(45) Date of Patent: Oct. 4, 2022

(54) METHOD FOR PERFORMING D2D OPERATION IN WIRELESS COMMUNICATION SYSTEM, AND TERMINAL USING SAME

(71) Applicant: LG ELECTRONICS INC., Seoul (KR)

(72) Inventors: Seungmin Lee, Seoul (KR); Hanbyul Seo, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/663,717

(22) Filed: Oct. 25, 2019

(65) Prior Publication Data

US 2020/0059392 A1 Feb. 20, 2020

Related U.S. Application Data

(63) Continuation of application No. 15/541,355, filed as application No. PCT/KR2016/000021 on Jan. 4, 2016, now Pat. No. 10,530,627.

(Continued)

(51) Int. Cl.
*H04L 27/26* (2006.01)
*H04L 5/00* (2006.01)
(Continued)

(52) U.S. Cl.
CPC .......... *H04L 27/2657* (2013.01); *H04L 5/001* (2013.01); *H04L 5/0048* (2013.01);
(Continued)

(58) Field of Classification Search
CPC . H04L 27/2657; H04L 27/2655; H04L 5/001; H04L 5/0048; H04L 5/0091;
(Continued)

(56) References Cited

U.S. PATENT DOCUMENTS 9,736,674 B2 8/2017 Kim et al.
2013/0273924 A1 10/2013 Hakola et al.
(Continued)

FOREIGN PATENT DOCUMENTS

KR 20120100833 9/2012
WO 2012108621 8/2012
(Continued)

OTHER PUBLICATIONS

U.S. Appl. No. 62/033,464 P (provisional application) filed Year: 2014.*

(Continued)

*Primary Examiner* — Yemane Mesfin
*Assistant Examiner* — Intekhaab A Siddiquee
(74) *Attorney, Agent, or Firm* — Lee Hong Degerman Kang Waimey

(57) ABSTRACT

Provided are a method for performing device-to-device (D2D) operation of a terminal in a wireless communication system, and a terminal using the same. The method is characterized by applying frequency synchronization on the basis of a primary cell of a first frequency, applying time synchronization on the basis of a non-serving cell of a second frequency for which D2D operation is to be performed, and performing the D2D operation on the basis of the frequency synchronization and the time synchronization.

12 Claims, 15 Drawing Sheets

Related U.S. Application Data

(60) Provisional application No. 62/190,754, filed on Jul. 10, 2015, provisional application No. 62/151,415, filed on Apr. 23, 2015, provisional application No. 62/103,503, filed on Jan. 14, 2015, provisional application No. 62/099,213, filed on Jan. 2, 2015.

(51) Int. Cl.
| | |
|---|---|
| *H04W 8/00* | (2009.01) |
| *H04W 56/00* | (2009.01) |
| *H04W 72/04* | (2009.01) |
| *H04W 76/14* | (2018.01) |
| *H04W 76/27* | (2018.01) |
| *H04L 5/14* | (2006.01) |
| *H04W 4/70* | (2018.01) |

(52) U.S. Cl.
CPC .............. *H04L 5/0091* (2013.01); *H04W 8/00* (2013.01); *H04W 8/005* (2013.01); *H04W 56/00* (2013.01); *H04W 56/001* (2013.01); *H04W 56/002* (2013.01); *H04W 72/04* (2013.01); *H04W 72/0453* (2013.01); *H04W 76/14* (2018.02); *H04W 76/27* (2018.02); *H04L 5/0037* (2013.01); *H04L 5/14* (2013.01); *H04L 27/2655* (2013.01); *H04W 4/70* (2018.02); *H04W 72/0406* (2013.01)

(58) Field of Classification Search
CPC ........ H04L 5/0037; H04L 5/14; H04W 76/14; H04W 76/27; H04W 8/00; H04W 8/005; H04W 56/00; H04W 56/001; H04W 56/002; H04W 72/04; H04W 72/0453; H04W 72/0406; H04W 4/70
USPC ........................................................ 370/336
See application file for complete search history.

(56) References Cited

U.S. PATENT DOCUMENTS

| | | | |
|---|---|---|---|
| 2013/0308490 A1 | 11/2013 | Lim et al. | |
| 2014/0051426 A1 | 2/2014 | Siomina et al. | |
| 2014/0128115 A1 | 5/2014 | Siomina et al. | |
| 2014/0328329 A1 | 11/2014 | Novlan et al. | |
| 2015/0215982 A1* | 7/2015 | Siomina ................ | H04W 76/14 370/252 |
| 2016/0088458 A1 | 3/2016 | Chae et al. | |
| 2016/0198339 A1* | 7/2016 | Siomina ................ | H04L 5/0094 455/41.2 |
| 2016/0323870 A1 | 11/2016 | Wei et al. | |
| 2017/0142741 A1 | 5/2017 | Kaur et al. | |
| 2017/0150480 A1* | 5/2017 | Kim ........................ | H04L 67/12 |
| 2017/0290020 A1 | 10/2017 | Aiba et al. | |
| 2017/0295585 A1* | 10/2017 | Sorrentino ............ | H04W 8/005 |
| 2018/0270098 A1 | 9/2018 | Lee et al. | |

FOREIGN PATENT DOCUMENTS

| | | | |
|---|---|---|---|
| WO | 2013091229 | 6/2013 | |
| WO | 2013162333 | 10/2013 | |
| WO | WO-2014113537 A1 * | 7/2014 | ........ H04W 72/0446 |
| WO | 2014185747 | 11/2014 | |
| WO | 2014196771 | 12/2014 | |
| WO | WO-2015065768 A1 * | 5/2015 | ............ H04W 48/18 |

OTHER PUBLICATIONS

U.S. Appl. No. 61/931,037 P (provisional application) filed Year: 2014.*
U.S. Appl. No. 62/035,726 P (provisional application) filed Year: 2014.*
U.S. Appl. No. 62/026,552 P (provisional application) filed Year: 2014.*
U.S. Appl. No. 62/060,372 P, filed Year: 2014.*
U.S. Appl. No. 16/404,904, Office Action dated Oct. 31, 2019, 51 pages.
PCT International Application No. PCT/KR2016/000020, International Search Report dated Apr. 4, 2016, 3 pages.
Intellectual Property Office of India Application No. 201737022879, Office Action dated Dec. 26, 2019, 8 pages.
PCT International Application No. PCT/KR2016/000021, Written Opinion of the International Searching Authority dated Apr. 15, 2016, 4 pages.
CATT, "Discussion on synchronization for D2D operation," 3GPP TSG-RAN WG1 #75, R1-135091, Nov. 2013, 7 pages.
Intel Corporation, "Discussion on D2D Synchronization," 3GPP TSG-RAN WG1 #75, R1-135113, Nov. 2013, 9 pages.
3rd Generation Partnership Project (3GPP), "Technical Specification Group Radio Access Network; Evolved Universal Terrestrial Radio Access (E-UTRA); Physical layer procedures (Release 12)," 3GPP TS 36.213 V12.5.0, Mar. 2015, 239 pages.
Korean Intellectual Property Office Application No. 10-2017-7017881, Office Action dated Apr. 12, 2019, 2 pages.
Ericsson, "Inclusion of ProSe," 3GPP TSG-RAN WG1 Meeting #79, R1-145489, San Francisco, USA, Nov. 17-21, 2014, 126 pages.
Huawei et al., "Final details of D2D synchronization signals," 3GPP TSG RAN WG1 Meeting #79, R1-144566, San Francisco, USA, Nov. 17-21, 2014, 13 pages.
U.S. Appl. No. 15/541,355, Final Office Action dated Mar. 11, 2019, 11 pages.
U.S. Appl. No. 15/541,355, Office Action dated Sep. 7, 2018, 14 pages.
Ericsson, et al., "Synchronization Procedures and Signals for D2D Discovery and Communication", 3GPP TSG RAN WG1 Meeting #74, R1-132911, Aug. 2013, 14 pages.
ETSI: "Universal Mobile Telecommunications System (UMTS); LTE; Proximity-based services (ProSe); Stage 2 (3GPP TS 23.303 version 12.2.0 Release 12)," ETSI TS 123 303 V12.2.0, Sep. 2014, 63 pages.
U.S. Appl. No. 16/404,904, Final Office Action dated May 22, 2020, 20 pages.
European Patent Office Application Serial No. 16732897.0, Search Report dated Jul. 13, 2018, 9 pages.
U.S. Appl. No. 15/541,101, Office Action dated Aug. 28, 2018, 28 pages.
ITRI, "Inter-Frequency Support of ProSe Direct Communication", 3GPP TSG RAN WG2 Meeting #88, R2-144990, Nov. 2014, 3 pages.
Korean Intellectual Property Office Application No. 10-2017-7017881, Office Action dated Oct. 18, 2018, 5 pages.
Ericsson, "Synchronization Signals and Channel Design for D2D Discovery and Communication", 3GPP TSG RAN WG1 Meeting #76, R1-140774, Feb. 2014, 7 pages.

* cited by examiner

METHOD FOR PERFORMING D2D OPERATION IN WIRELESS COMMUNICATION SYSTEM, AND TERMINAL USING SAME

CROSS-REFERENCE TO RELATED APPLICATIONS

This application is continuation of U.S. patent application Ser. No. 15/541,355, filed on Jun. 30, 2017, now U.S. Pat. No. 10,530,627, which is the National Stage filing under 35 U.S.C. 371 of International Application No. PCT/KR2016/000021, filed on Jan. 4, 2016, which claims the benefit of U.S. Provisional Application No. 62/099,213, filed on Jan. 2, 2015, 62/103,503, filed on Jan. 14, 2015, and 62/151,415, filed on Apr. 23, 2015, and 62/190,754, filed on Jul. 10, 2015, the contents of which are all hereby incorporated by reference herein in their entirety.

BACKGROUND OF THE INVENTION

Field of the Invention

The present invention relates to wireless communication, and more particularly, to a method for performing D2D (device-to-device) operation in a wireless communication system and the terminal using the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, 3$^{rd}$ Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D22) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

Meanwhile, a UE may have a radio resource control (RRC) connection with a network through a specific carrier wave. In this case, the specific carrier may be referred to as a primary carrier. Conventionally, the UE is assumed to perform the D2D operation only using the primary carrier wave. However, currently, it is also considered to perform the D2D operation using a carrier wave other than the primary carrier wave, and the serving cell for the UE is not present using the other carrier wave. In this case, it is not clear how to perform downlink measurement or synchronization necessary for the UE to perform the D2D operation, in particular, the D2D signal transmission.

SUMMARY OF THE INVENTION

The present invention is to provide a method for performing D2D (device-to-device) operation in a wireless communication system and the terminal using the method.

In one aspect, provided is a method performing a device-to-device (D2D) operation of a user equipment in a wireless communication system. The method includes applying frequency synchronization based on a primary cell of a first frequency, applying time synchronization based on a non-serving cell of a second frequency to intend to perform the D2D operation and performing the D2D operation based on the frequency synchronization and the time synchronization.

The first frequency and the second frequency may be different.

The user equipment may be located within a coverage of the non-serving cell.

The D2D operation may be one of signal transmission associated with D2D communication or signal transmission associated with D2D discovery.

Frequency synchronization and time synchronization values between the primary cell and the non-serving cell may be less than or equal to a predetermined value.

In another aspect, provided is a user equipment. The user equipment includes an RF (Radio Frequency) unit for transmitting and receiving a radio signal and a processor coupled to the RF unit. The processor is configured to apply frequency synchronization based on a primary cell at a first frequency, apply time synchronization based on a non-serving cell at a second frequency to intend to perform the D2D operation and perform the D2D operation based on the frequency synchronization and the time synchronization.

The UE may transmit the D2D signal using a carrier other than a primary carrier having the RRC connection with the network. Downlink measurement and synchronization may be required to transmit the D2D signal. In the present invention, when the UE is within the coverage of a cell (NON-SERVING CELL) other than the serving cell for the UE, the non-serving cell using a carrier performing the D2D operation, the UE adjusts frequency synchronization based on its primary cell and adjusts time synchronization based on the NON-SERVING CELL, and then performs the D2D operation.

DESCRIPTION OF EXEMPLARY EMBODIMENTS

Figure 1:
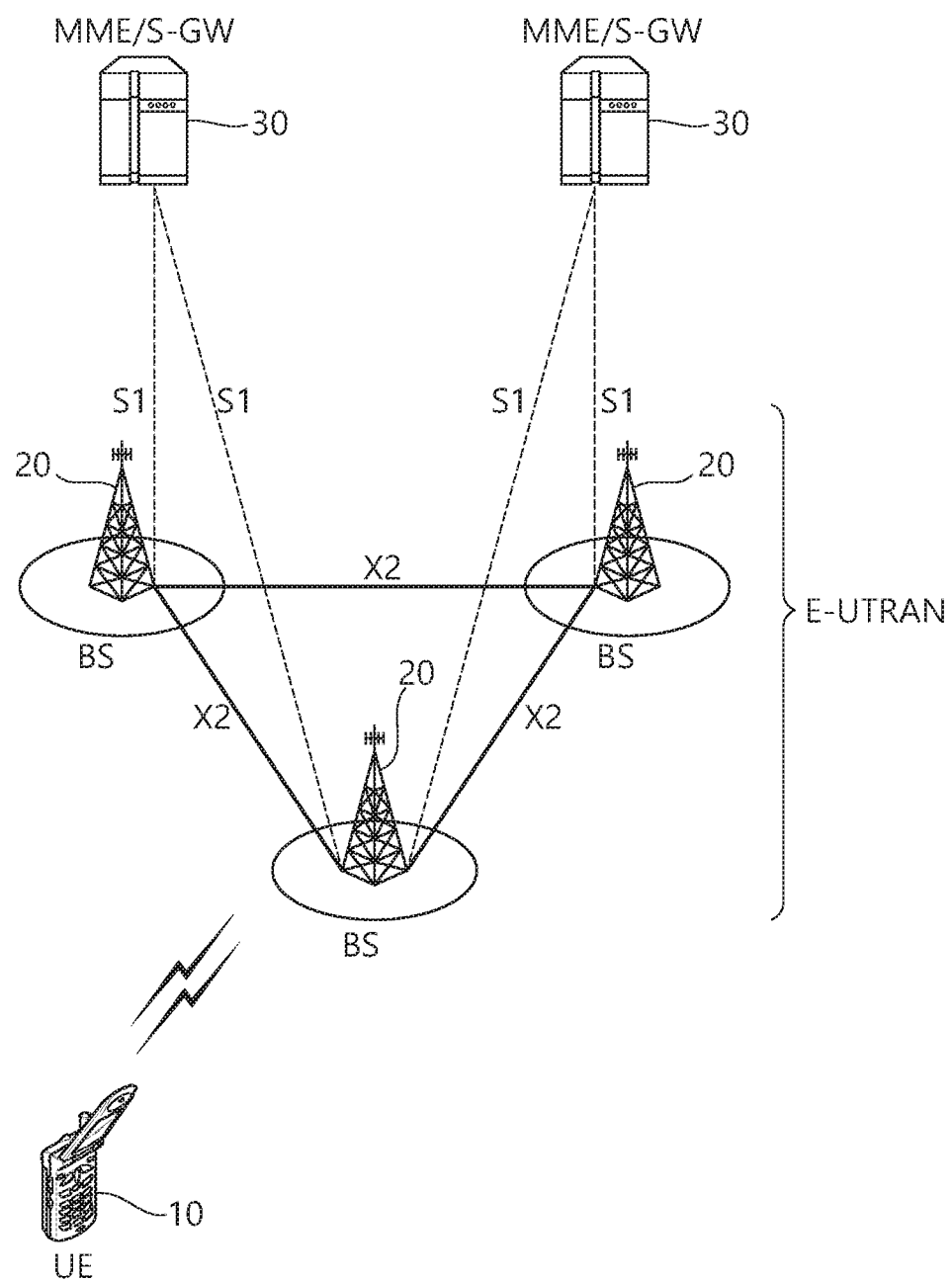
FIG. 1 shows a wireless communication system to which the present invention is applied.

FIG. 1 shows a wireless communication system.

The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
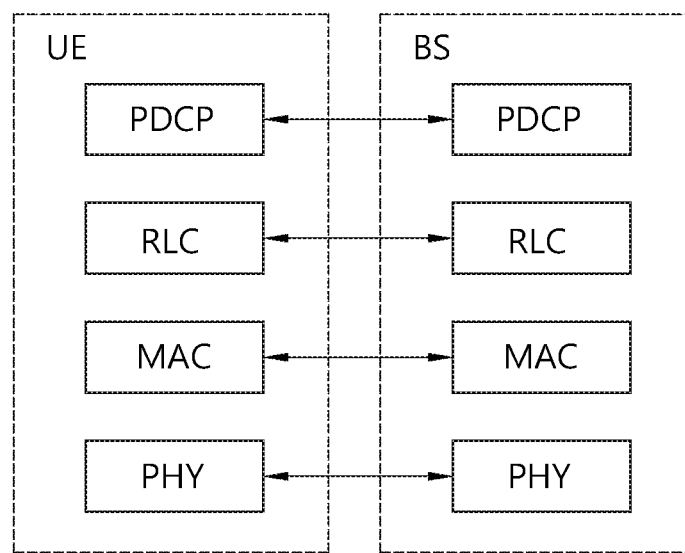
FIG. 2 is a diagram showing a wireless protocol architecture for a user plane.
Figure 3:
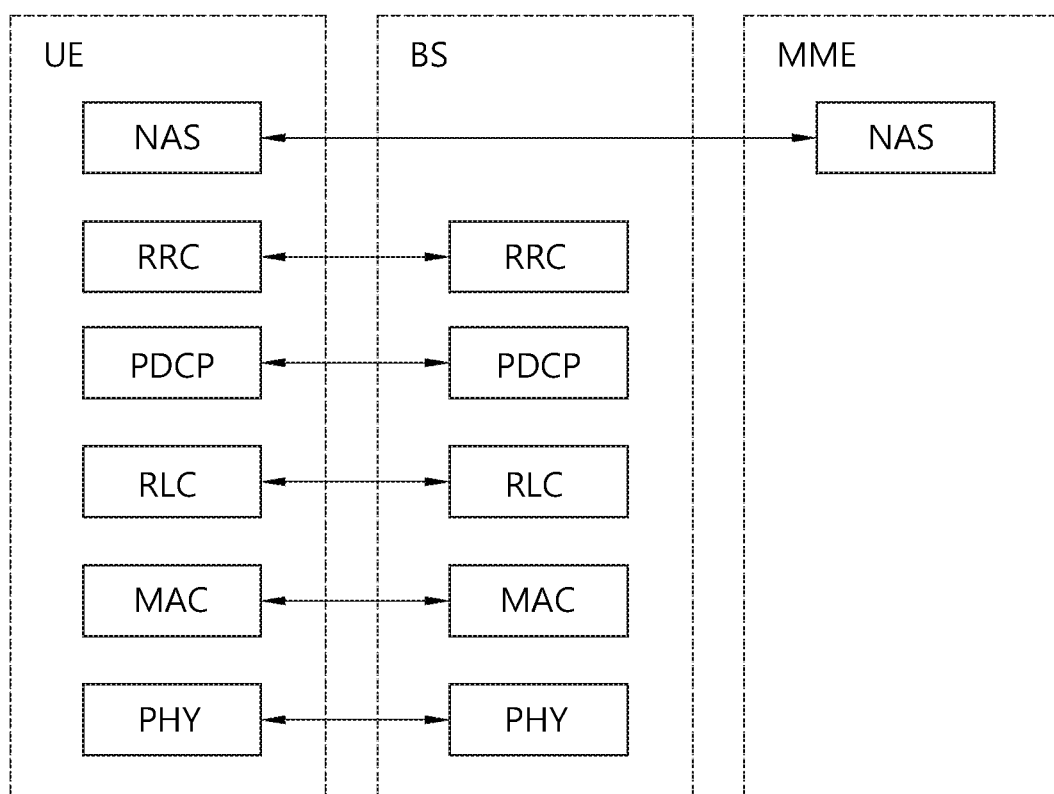
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

The D2D operation will now be described. In 3GPP LTE-A, the service related to D2D operation is called proximity based service (ProSe). Hereinafter, ProSe is equivalent to D2D operation and ProSe may be interchanged with D2D operation. ProSe will now be described.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 4:
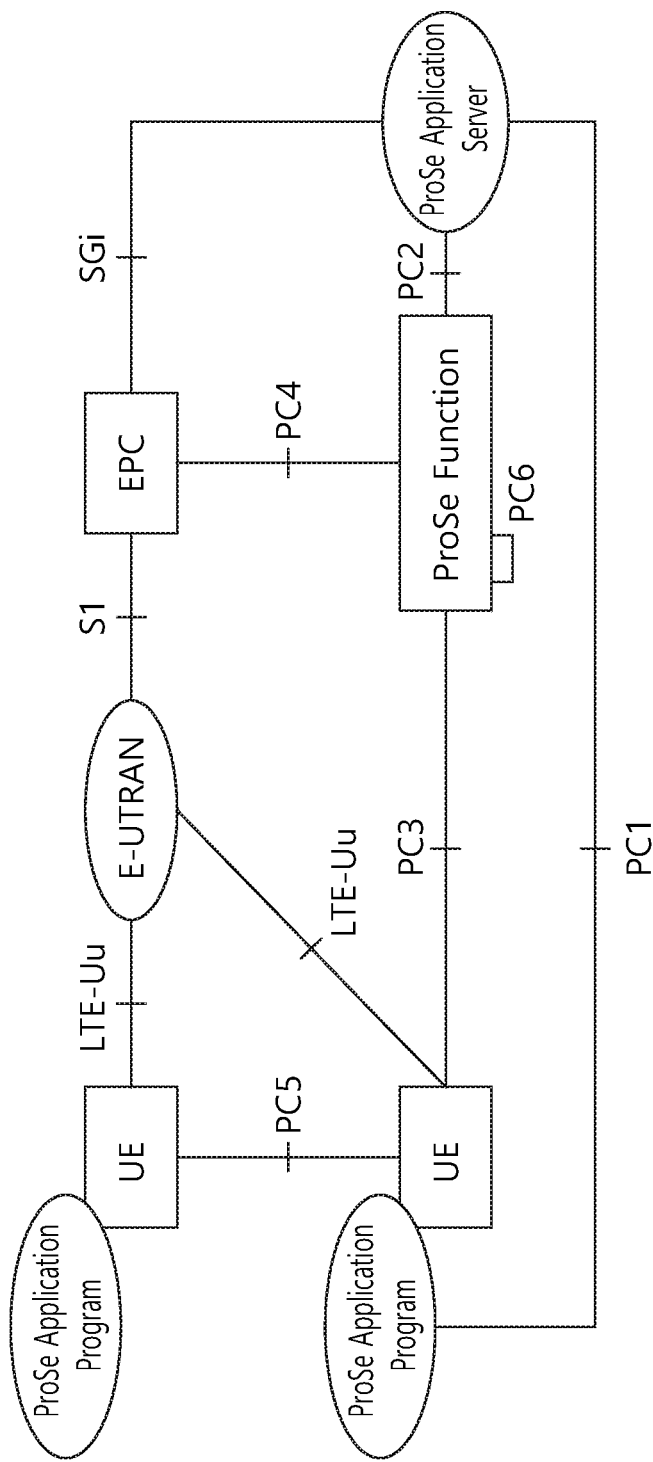
FIG. 4 shows a basic structure for ProSe.

FIG. 4 shows a basic structure for ProSe.

Referring to FIG. 4, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications

Authorization and configuration of UE for discovery and direct communication

Enable the functionality of EPC level ProSe discovery

ProSe related new subscriber data and handling of data storage, and also handling of the ProSe identities Security related functionality Provide control towards the EPC for policy related functionality Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

The D2D operation may be supported both when UE is serviced within the coverage of a network (cell) or when it is out of coverage of the network.

Figure 5:
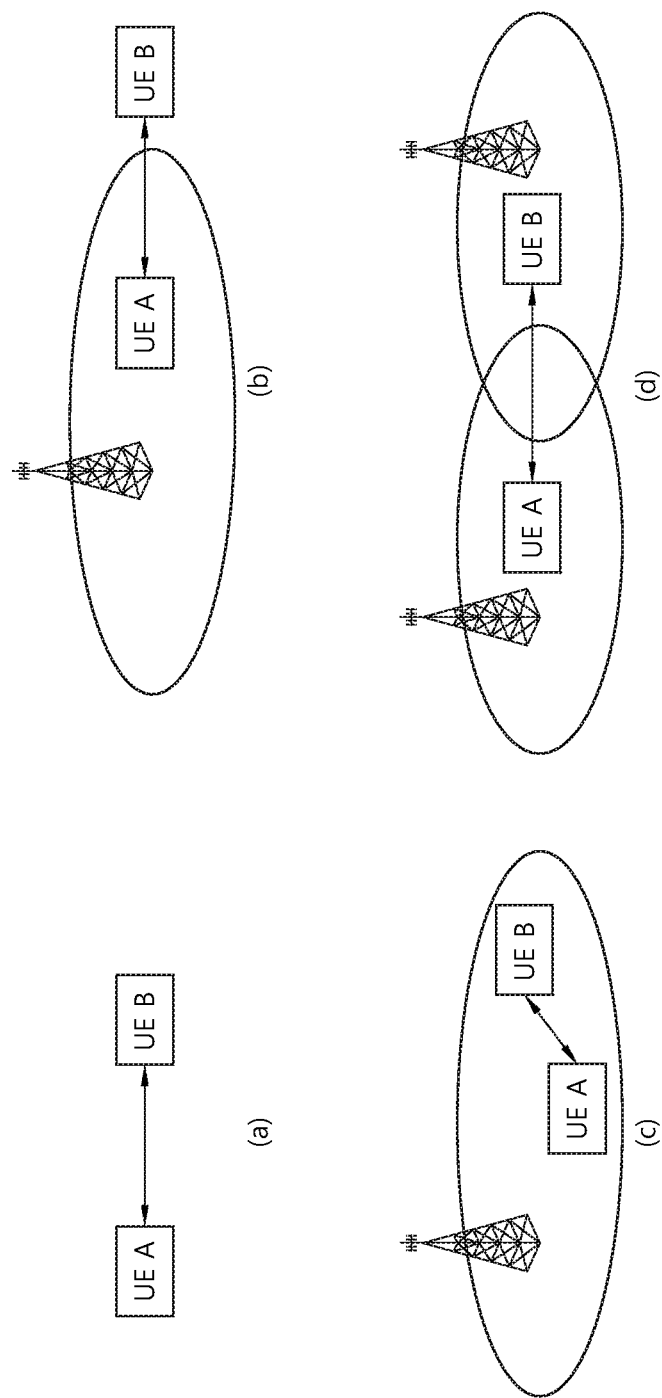
FIG. 5 shows the deployment examples of types of UE performing ProSe direct communication and cell coverage.

FIG. 5 shows the deployment examples of types of UE performing ProSe direct communication and cell coverage.

Referring to FIG. 5(a), types of UE A and B may be placed outside cell coverage. Referring to FIG. 5(b), UE A may be placed within cell coverage, and UE B may be placed outside cell coverage. Referring to FIG. 5(c), types of UE A and B may be placed within single cell coverage. Referring to FIG. 5(d), UE A may be placed within coverage of a first cell, and UE B may be placed within coverage of a second cell.

ProSe direct communication may be performed between types of UE placed at various positions as in FIG. 5.

<Radio Resource Allocation for D2D Communication (ProSe Direct Communication)>.

At least one of the following two modes may be used for resource allocation for D2D communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<D2D Discovery (ProSe Direct Discovery)>

D2D discovery refers to the procedure used in a ProSe capable terminal discovering other ProSe capable terminals in close proximity thereto and may be referred to as ProSe direct discovery. The information used for ProSe direct discovery is hereinafter referred to as discovery information.

A PC 5 interface may be used for D2D discovery. The PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement. The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration for discovery information announcement to types of UE. The configuration may be broadcasted through the SIB. The configuration may be provided through a UE-specific RRC message. Or the configuration may be broadcasted through other than the RRC message in other layer or may be provided by UE-specific signaling.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner.

UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Figure 6:
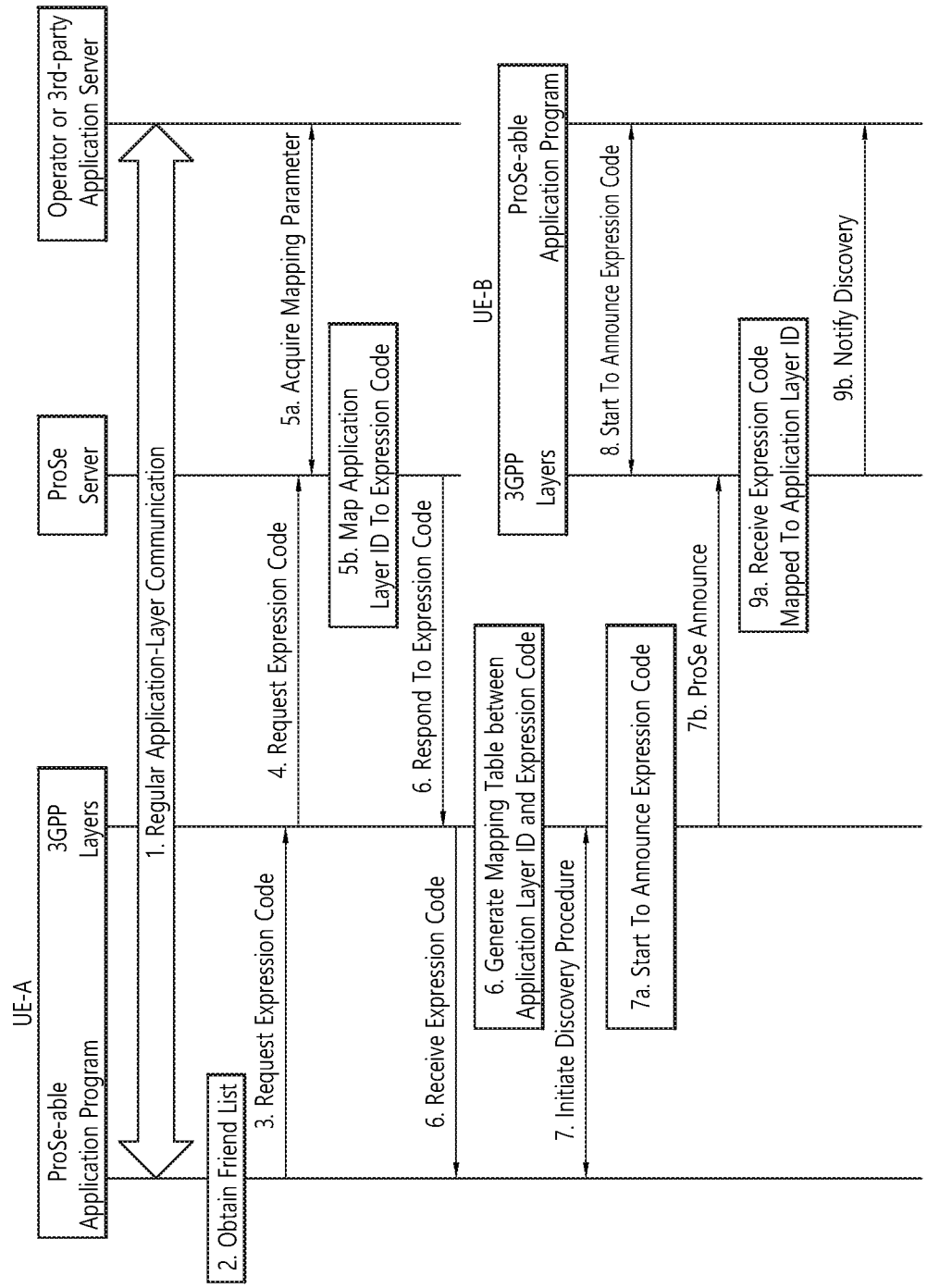
FIG. 6 is an embodiment of a ProSe discovery process.

FIG. 6 is an embodiment of a ProSe discovery process.

Referring to FIG. 6, it is assumed that UE A and UE B have ProSe-enabled application programs managed therein and have been configured to have a 'friend' relation between them in the application programs, that is, a relationship in which D2D communication may be permitted between them. Hereinafter, the UE B may be represented as a 'friend' of the UE A. The application program may be, for example, a social networking program. '3GPP Layers' correspond to the functions of an application program for using ProSe discovery service, which have been defined by 3GPP.

Direct discovery between the types of UE A and B may experience the following process.

1. First, the UE A performs regular application layer communication with the APP server. The communication is based on an Application Program Interface (API).

2. The ProSe-enabled application program of the UE A receives a list of application layer IDs having a 'friend' relation. In general, the application layer ID may have a network access ID form. For example, the application layer ID of the UE A may have a form, such as "adam@example.com."

3. The UE A requests private expressions code for the user of the UE A and private representation code for a friend of the user.

4. The 3GPP layers send a representation code request to the ProSe server.

5. The ProSe server maps the application layer IDs, provided by an operator or a third party APP server, to the private representation code. For example, an application layer ID, such as adam@example.com, may be mapped to private representation code, such as "GTER543$#2FSJ67DFSF." Such mapping may be performed based on parameters (e.g., a mapping algorithm, a key value and so on) received from the APP server of a network.

6. The ProSe server sends the types of derived representation code to the 3GPP layers. The 3GPP layers announce the successful reception of the types of representation code for the requested application layer ID to the ProSe-enabled application program. Furthermore, the 3GPP layers generate a mapping table between the application layer ID and the types of representation code.

7. The ProSe-enabled application program requests the 3GPP layers to start a discovery procedure. That is, the ProSe-enabled application program requests the 3GPP layers to start discovery when one of provided 'friends' is placed in proximity to the UE A and direct communication is possible. The 3GPP layers announces the private representation code (i.e., in the above example, "GTER543$#2FSJ67DFSF", that is, the private representation code of adam@example.com) of the UE A. This is hereinafter called 'announcement'. Mapping between the application layer ID of the corresponding application program and the private representation code may be known to only 'friends' which have previously received such a mapping relation, and the 'friends' may perform such mapping.

8. It is assumed that the UE B operates the same ProSe-enabled application program as the UE A and has executed the aforementioned 3 to 6 steps. The 3GPP layers placed in the UE B may execute ProSe discovery.

9. When the UE B receives the aforementioned 'announce' from the UE A, the UE B determines whether the private representation code included in the 'announce' is known to the UE B and whether the private representation code is mapped to the application layer ID. As described the 8 step, since the UE B has also executed the 3 to 6 steps, it is aware of the private representation code, mapping between the private representation code and the application layer ID, and corresponding application program of the UE A. Accordingly, the UE B may discover the UE A from the 'announce' of the UE A. The 3GPP layers announce that adam@example.com has been discovered to the ProSe-enabled application program within the UE B.

In FIG. 6, the discovery procedure has been described by taking into consideration all of the types of UE A and B, the ProSe server, the APP server and so on. From the viewpoint of the operation between the types of UE A and B, the UE A sends (this process may be called announcement) a signal called announcement, and the UE B receives the announce and discovers the UE A. That is, from the aspect that an operation that belongs to operations performed by types of UE and that is directly related to another UE is only step, the discovery process of FIG. 6 may also be called a single step discovery procedure.

Figure 7:
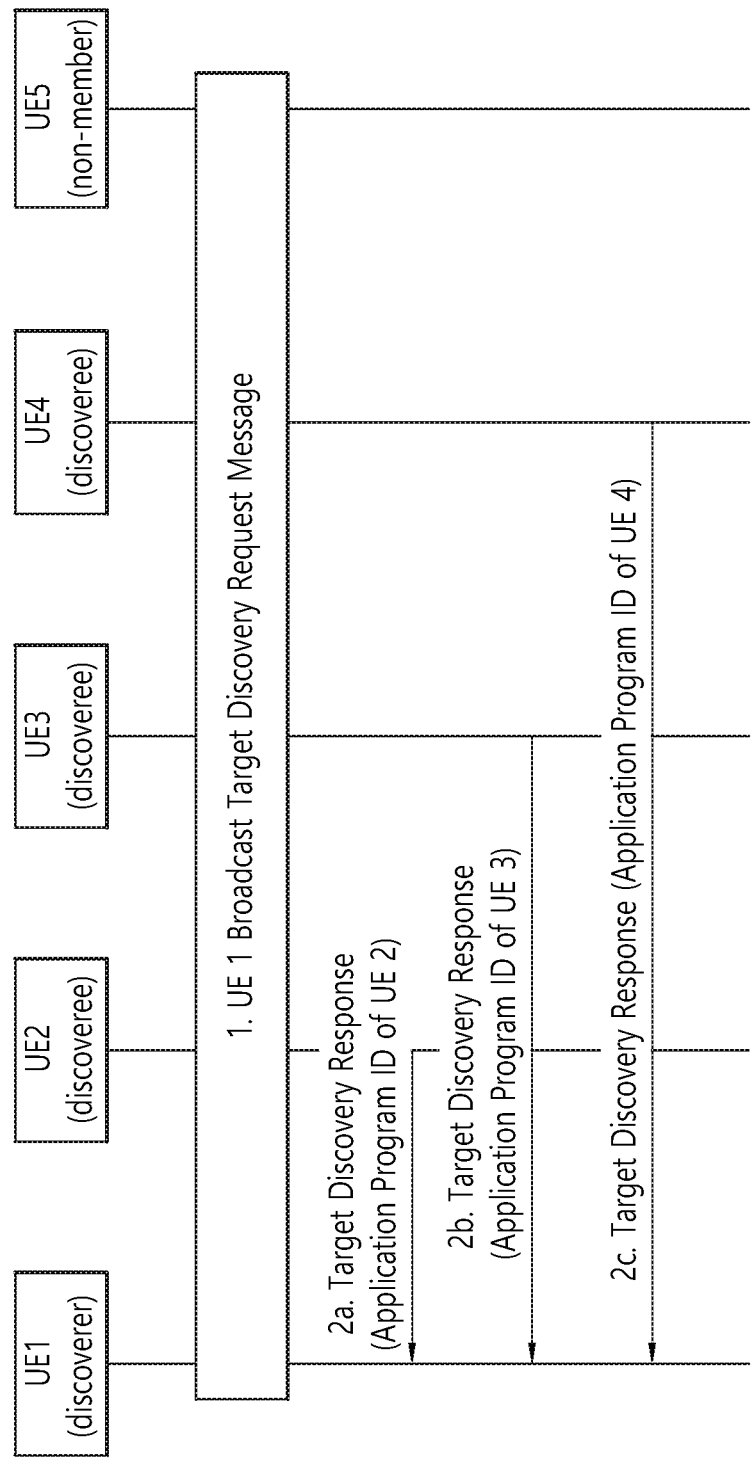
FIG. 7 is another embodiment of a ProSe discovery process.

FIG. 7 is another embodiment of a ProSe discovery process.

In FIG. 7, types of UE 1 to 4 are assumed to types of UE included in specific group communication system enablers (GCSE) group. It is assumed that the UE 1 is a discoverer and the types of UE 2, 3, and 4 are discoveree. UE 5 is UE not related to the discovery process.

The UE 1 and the UE 2-4 may perform a next operation in the discovery process.

First, the UE 1 broadcasts a target discovery request message (may be hereinafter abbreviated as a discovery request message or M1) in order to discover whether specific UE included in the GCSE group is in proximity. The target discovery request message may include the unique application program group ID or layer-2 group ID of the specific GCSE group. Furthermore, the target discovery request message may include the unique ID, that is, application program private ID of the UE 1. The target discovery request message may be received by the types of UE 2, 3, 4, and 5.

The UE 5 sends no response message. In contrast, the types of UE 2, 3, and 4 included in the GCSE group send a target discovery response message (may be hereinafter abbreviated as a discovery response message or M2) as a response to the target discovery request message. The target discovery response message may include the unique application program private ID of UE sending the message.

An operation between types of UE in the ProSe discovery process described with reference to FIG. 7 is described below. The discoverer (the UE 1) sends a target discovery request message and receives a target discovery response message, that is, a response to the target discovery request message. Furthermore, when the discoveree (e.g., the UE 2) receives the target discovery request message, it sends a target discovery response message, that is, a response to the target discovery request message. Accordingly, each of the types of UE performs the operation of the 2 step. In this aspect, the ProSe discovery process of FIG. 7 may be called a 2-step discovery procedure.

In addition to the discovery procedure described in FIG. 7, if the UE 1 (the discoverer) sends a discovery conform message (may be hereinafter abbreviated as an M3), that is, a response to the target discovery response message, this may be called a 3-step discovery procedure.

Meanwhile, a UE supporting D2D operation may provide relay functionality to another network node (e.g., another UE or a base station).

Figure 8:
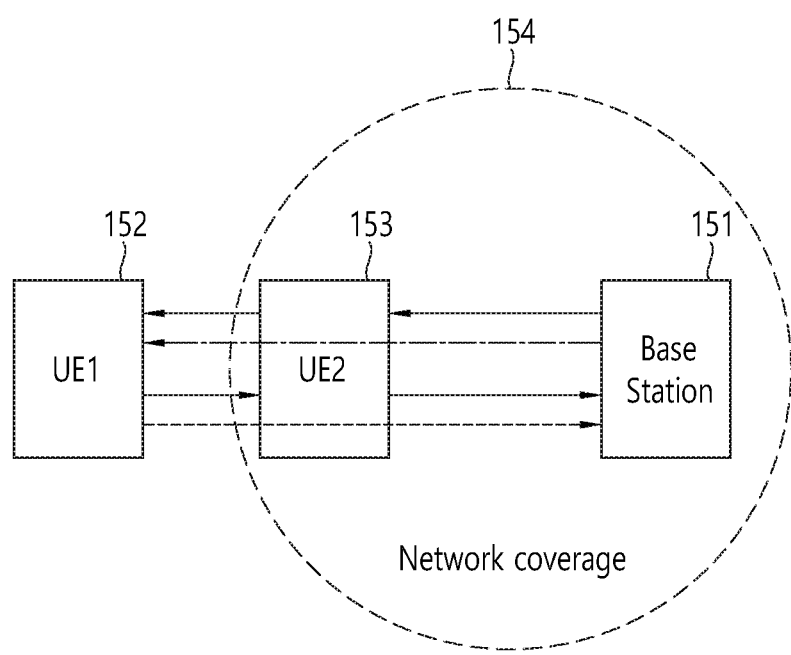
FIG. 8 shows an example of the UE providing the relay functionality.

FIG. 8 shows an example of the UE providing the relay functionality.

Referring to FIG. 8, UE2 153 performs a repeater function between the base station 151 and UE1 152. That is, the UE2 153 may be referred to as a network node that performs a relay function between the UE1 152 located outside the coverage 154 of the network and the network 151. D2D operation may be performed between UE1 and UE2 152 and 153. Conventional cellular communication or wide area network (WAN) communication may be performed between UE2 153 and network 151. In FIG. 8, since UE1 152 is located outside the network coverage, it cannot communicate with network 151 if UE2 153 does not provide the relay function therebetween.

The present invention will now be described.

The present invention proposes a method for a UE to transmit a synchronization signal and a broadcast channel in order to perform a D2D operation.

The UE may be a UE serving as a relay unit. In one example, a UE 1 supporting D2D operation may perform a similar role as a repeater between the UE 2 located outside the coverage of the network and the network. That is, the UE 1 may receive a signal transmitted from the network and send the signal to the UE 2 outside the coverage or may receive a signal transmitted by the UE 2 outside the coverage and transmit the signal to the network. The D2D operation may be used between the UEs 1 and 2.

Hereinafter, the UE performing the relay communication using the D2D operation will be referred to as 'D2D UE', or 'DRUE'. DRUE may transmit a synchronization signal and a broadcast channel when performing relay communication using the D2D operation. Hereinafter, the synchronization signal used for the D2D operation will be referred to as SSS (SIDELINK SYNCHRONIZATION SIGNAL), and the broadcast channel used for the D2D operation will be referred to as PSBCH (PHYSICAL SIDELINK BROADCAST CHANNEL), in order to distinguish from an existing synchronization signal and broadcast channel.

The SSS may include at least one of a PRIMARY SIDELINK SYNCHRONIZATION SIGNAL (PSSS) and a SECONDARY SIDELINK SYNCHRONIZATION SIGNAL (SSSS).

Hereinafter, it is referred to as D2D communication that the UE communicates directly with another UE using a wireless channel (That is, in the following, the above-mentioned ProSe direct communication and ProSe discovery are collectively referred to as D2D communication.) The UE refers to the user device. However, a network equipment such as the base station may be regarded as a kind of UE when the network equipment such as the base station transmits/receives signals according to a communication method between the UEs.

Hereinafter, the present invention will be described with reference to the 3GPP LTE/LTE-A system for the convenience of description, but the scope of the system to which the present invention is applied is not limited to the 3GPP LTE/LTE-A system and may be extended to other systems.

An example of the PSBCH and SSS transmission operation/method is shown in the following Table 1. For ease of discussion, reference to "Table 1" in the specification refers to the disclosure of the PSBCH of Section 9.6 and the disclosure of the SSS of Section 9.7, and included subsections, as set out as follows.

9.6 Physical Sidelink Broadcast Channel (PSBCH)

9.6.1 Scrambling

The block of bits $b(0), \ldots, b(M_{bit}-1)$, where $M_{bit}$ is the number of bits transmitted on the physical sidelink broadcast channel in one subframe, shall be scrambled according to clause 5.3.1. The scrambling sequence generator shall be initialised at the start of every PSBCH subframe with $c_{init}=N_{ID}^{SL}$.

9.6.2 Modulation

Modulation shall be done according to clause 5.3.2. Table 9.6.2-1 specifies the modulation mappings applicable for the physical sidelink broadcast channel.

TABLE 9.6.2-1

<PSBCH modulation schemes>

| Physical channel | Modulation schemes. |
|---|---|
| PSBCH | QPSK |

9.6.3 Layer Mapping

Layer mapping shal be done according to clause 5.3.2A assuming a single antenna port, v=1.

9.6.4 Transform Precoding

Transform precoding shall be done according to clause 5.3.3 with $M_{RB}^{PUSCH}$ and $M_{sc}^{PUSCH}$ replaced by $M_{RB}^{PSBCH}$ and $M_{sc}^{PSBCH}$ respectively.

9.6.5 Precoding

Precoding shall be done according to clause 5.3.3A assuming a single antenna port, v=1.

9.6.6 Mapping to Physical Resources

The block of complex-valued symbols $z(0), \ldots, z(M_{symb}^{ap}-1)$ shall be multiplied with the amplitude scaling factor $\beta_{PSBCH}$ in order to conform to the transmit power $P_{PSBCH}$ specified in [4], and mapped in sequence starting with z(0) to physical resource blocks on antenna port p and assigned for transmission of PSBCH. The mapping to resource elements (k,l) corresponding to the physical resource blocks assigned for transmission and not used for transmission of reference signals or synchronization signals shall be in increasing order of first the index k, then the index l, starting with the first slot in the subframe. Resource elements in the last SC-FDMA symbol within a subframe should be counted in the mapping process but not transmitted.

The PSBCH shall use the same set of resource blocks as the synchronization signal.

9.7 Sidelink Synchronization Signals (SSS)

A physical-layer sidelink synchronization identity is represented by $N_{ID}^{SL} \in \{0, 1, \ldots, 335\}$, divided into two the two sets id_net and id_oon consisting of identities $\{0, 1, \ldots, 167\}$ and $\{168, 169, \ldots, 335\}$, respectively.

9.7.1 Primary Sidelink Synchronization Signal (PSSS)

The primary sidelink synchronization signal is transmitted in two adjacent SC-FDMA symbols in the same subframe.

9.7.1.1 Sequence Generation

Each of the two sequences $d_i(0), \ldots, d_i(61)$, i=1, 2 used for the primary sidelink synchronization signal in the two SC-FDMA symbols is given by clause 6.11.1.1 with root index u=26 if $N_{ID}^{SL} \leq 167$ and u=37 otherwise.

9.7.1.2 Mapping to Resource Elements

The sequence $d_i(u)$ shall be multiplied with the amplitude scaling factor $\beta_{PSBCH}$ and mapped to resource elements on antenna port 1010 in the first slot in the subframe according to $$a_{k,l} = d_i(n),$$
$$n = 0, \ldots, 61$$
$$k = n - 31 + \frac{N_{RB}^{SL} N_{sc}^{RB}}{2}$$
$$l = \begin{cases} 1, 2 & \text{normal cyclic prefix} \\ 0, 1 & \text{extended cyclic prefix} \end{cases}$$

9.7.2 Secondary Sidelink Synchronization Signal (SSSS)

The secondary sidelink synchronization signal is transmitted in two adjacent SC-FDMA symbols in the same subframe.

9.7.2.1 Sequence Generation

Each of the two sequences $d_i(0), \ldots, d_i(61)$, i=1, 2 used for the secondary sidelink synchronization signal is given by clause 6.11.2.1 assuming subframe 0 with $N_{ID}^{(1)} = N_{ID}^{SL}$ mod 168 and $N_{ID}^{(2)} = \lfloor N_{ID}^{SL}/168 \rfloor$.

9.7.2.2 Mapping to Resource Elements

The sequence $d_i(n)$ shall be multiplied with the amplitude scaling factor $\beta_{SSSS} \leq \beta_{PSBCH}$ and mapped to resource elements on antenna port 1010 in the second slot in the subframe according to $$a_{k,l} = d_i(n),$$
$$n = 0, \ldots, 61$$
$$k = n - 31 + \frac{N_{RB}^{SL} N_{sc}^{RB}}{2}$$
$$l = \begin{cases} 4, 5 & \text{normal cyclic prefix} \\ 3, 4 & \text{extended cyclic prefix} \end{cases}$$

Referring to Table 1, the PSBCH may be transmitted through scrambling, modulation, layer mapping, transform precoding, precoding, mapping to physical resources, and the like.

A block of bits $b(0), \ldots, b(M_{bit-1})$ is scrambled using a scrambling sequence. Here, $M_{bit}$ represents the number of bits transmitted over the PBSCH in one subframe. The scrambling sequence used for scrambling may use a sequence generated based on the $N_{ID}^{SL}$ for each subframe transmitting the PSBCH. PSBCH uses QPSK as modulation scheme. Layer mapping and precoding are performed using the assumption of a single antenna port.

Next, a transmission method of the SSS will be described with reference to Table 1 above.

The SSS may include PSSS and SSSS. PSSS may be transmitted using two concatenated SC-FDMA symbols in the same subframe, more specifically, the second and third SC-FDMA symbols in the first slot (this is true of a normal CP; in an case of an extended CP, it may be transmitted using the first and second SC-FDMA symbols of the first slot). Two sequences, each having a length of 62 may be used for the two SC-FDMA symbols, and a root index of the sequences may be different between a case where the $N_{ID}^{SL}$ is 167 and a case where the $N_{ID}^{SL}$ is not 167. Here, the $N_{ID}^{SL}$ may be a physical-layer sidelink synchronization identity, and may have a value from 0 to 335 or less. The $N_{ID}^{SL}$ may be divided into id_net and id_oon, where id_net is a ID used in the coverage and id_oon is a ID used outside the coverage. Id_net may have a value from 0 to 167, and id_oon may have a value from 168 to 335.

SSSS may be transmitted using two concatenated SC-FDMA symbols in the same subframe, more specifically, the fifth and sixth SC-FDMA symbols in the second slot (this is true of a normal CP; in an case of an extended CP, it may be transmitted using the fourth and fifth SC-FDMA symbols of the second slot). Two sequences, each having a length of 62 may be used for the two SC-FDMA symbols, For convenience of explanation, some terms and situations to which the present invention is applied will be described.

Figure 9:
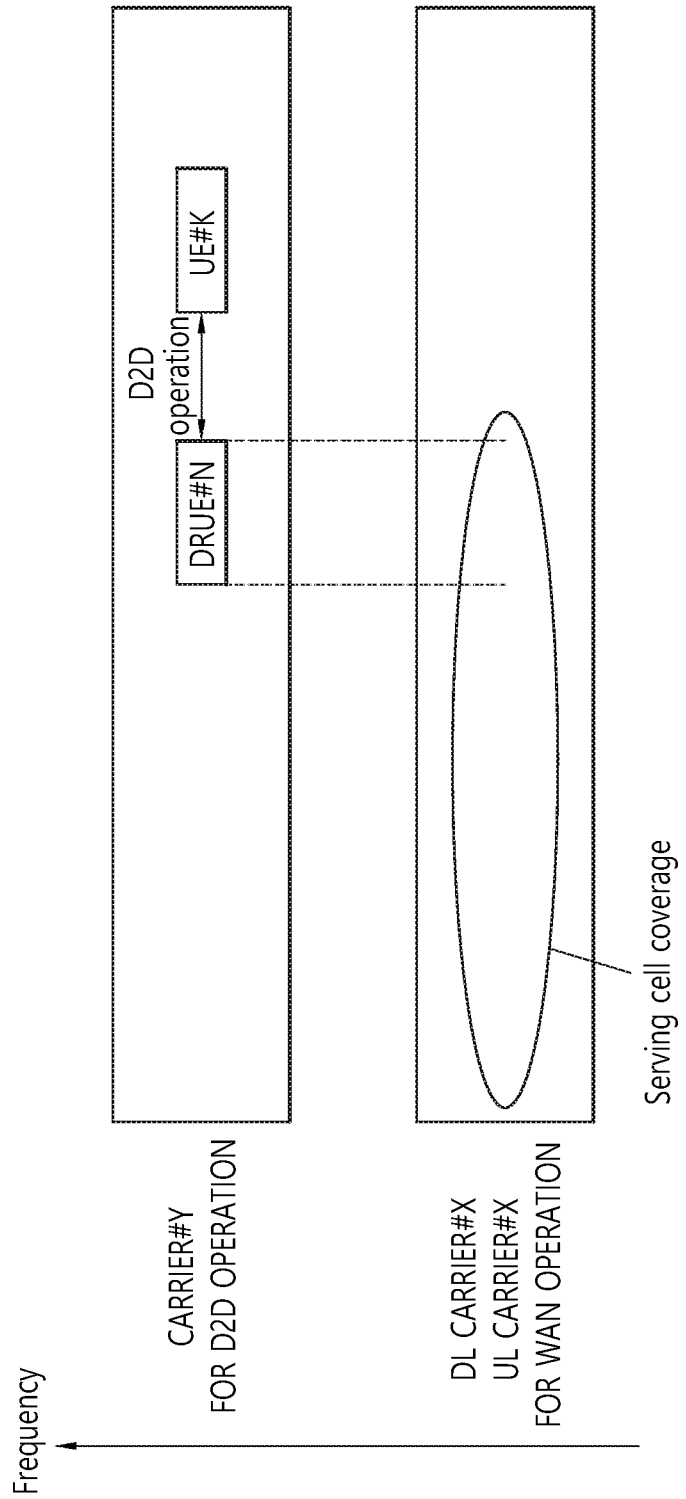
FIG. 9 shows DL CARRIER #X, UL CARRIER #X, and CARRIER #Y set for DRUE #N.

FIG. 9 shows DL CARRIER #X, UL CARRIER #X, and CARRIER #Y set for DRUE #N.

Referring to FIG. 9, DRUE #N is assigned 'DL CARRIER #X', which is a downlink carrier related to WAN (wide area network communication), and 'UL CARRIER #X', which is an uplink carrier related to WAN (wide area network communication). Further, DRUE #N is assigned 'CARRIER #Y' related to D2D communication (or D2D relay communication). That is, DL CARRIER #X and UL CARRIER #X are respectively downlink and uplink carriers constituting a serving cell of DRUE #N (or for which the serving cell of DRUE #N is present). CARRIER #Y is a carrier used for D2D communication.

Hereinafter, this situation is assumed and explained.

In D2D communication, the D2D communication related parameter values and the operation procedures used may vary depending on whether the UE is in network (cell) coverage or outside the coverage. Thus, the UE may need to perform measurements in order to determine whether the UE is in network (cell) coverage or outside the coverage, to perform D2D communication.

Hereinafter, based on (DL) CARRIER, measurements may be performed in order to determine whether the UE is in network (cell) coverage or outside the coverage, to perform D2D communication. Further, based on (DL) CARRIER, S-CRITERION (cell selection or reselection) may be determined. This (DL) CARRIER may be referred to as MEA_CARRIER. Further, based on the MEA_CARRIER, D2D communication related (downlink) measurement (e.g., (D2D transmission) power setting related PL (Pathloss) measurement) may be performed. Further, D2D communication related (downlink) synchronization may be based on the MEA_CARRIER. The MEA_CARRIER setting (or pairing) information may be communicated to the D2D UE via predefined signaling (e.g., SIB, RRC).

In the illustrated situation, in one example, DL CARRIER #X may be interpreted as being set to MEA_CARRIER of UL CARRIER #X (and/or MEA_CARRIER of CARRIER #Y may be interpreted as being set to DL CARRIER #X).

Also, the DRUE #N may be interpreted as an IN-COVERAGE D2D UE in a (communication) coverage of a base station performing WAN communication based on DL CARRIER #X.

In the illustrated situation, it is assumed that there is no base station performing WAN communication based on the corresponding CARRIER #Y. Accordingly, a D2D UE performing D2D communication only using CARRIER #Y is regarded as 'OUT-OF-COVERAGE (D2D UE)'.

CARRIER #Y may be interpreted as CARRIER (or resource) (or CARRIER which not assigned MEA_CARRIER) that is used only for D2D communication (or D2D relay communication).

In addition, for convenience of explanation, in one example, the OOC D2D UE that performs D2D RELAY communication with DRUE #N using CARRIER #Y is referred to as 'OOC D2D UE #K' In FIG. 9, UE #K is OOC D2D UE #K. The OOC D2D UE #K may be interpreted as D2D UE as that does not find the base station (or cell) on the DL CARRIER #X and performs the OOC D2D communication on CARRIER #Y that has been preconfigured. The OOC D2D UE #K may be interpreted a D2D UE which cannot perform D2D communication in the band to which UL CARRIER #X belongs due to RF Capability Limitation, but which is capable of performing D2D communication only in the band to which CARRIER #Y belongs.

Hereinafter, the proposals of the present invention may be applied only in a limited manner to following cases: a case when DRUE #N performs D2D communication (or D2D relay communication) only using CARRIER #Y and/or a case when DRUE #N performs D2D communication (or D2D relay communication) using both UL CARRIER #X and CARRIER #Y.

Also, the proposals of the present invention allow the OOC D2D UE #K to effectively receive the D2D Relay communication related information (or the D2D Relay communication data) by allowing DRUN #N to effectively transmit the SSS and/or the PSBCH when the DRUN #N carries out the D2D Relay communication on the CARRIER #Y. In one example, the DRUE #N may be interpreted as an OUTBAND RELAY. Here, the OUTBAND RELAY may be defined as a repeater in which the first link between the base station and the repeater and the second link between the repeater and the UE are not operated at the same frequency, or the first and second links are sufficiently isolated in the frequency domain such that interference is not problematic although the two links are simultaneously activated.

The proposals of the present invention can be extended, in one example, when DRUE #N carries out D2D communication (or D2D relay communication) on CARRIER #Y. Alternatively, the proposals of the present invention may be applied regardless of whether CARRIER #Y is assigned MEA_CARRIER (or whether MEA_CARRIER of CARRIER #Y is set to DL CARRIER #X). Otherwise, the proposals of the present invention may be applied only a case when CARRIER #Y is assigned MEA_CARRIER or when MEA_CARRIER of CARRIER #Y is set to DL CARRIER #X.

In addition, in one example, DRUE #N may be interpreted to relay DL CARRIER #X (which is MEA_CARRIER) (or UL CARRIER #X) related (system/relay) information (or (system/relay) information related to a base station performing WAN DL communication therewith using DL CARRIER #X) (to OOC D2D UE #K) using CARRIER #Y. In addition, in one example, DRUE #N may be interpreted to be in an RRC connection state (RRC_CONNECTED) in the view of DL CARRIER #X (which is MEA_CARRIER) (or UL CARRIER #X) or in the view of a base station performing WAN DL communication therewith using DL CARRIER #X.

[The present method #1] When DRUE #N transmits a D2D Relay communication related SSS and/or PSBCH using CARRIER #Y, it may be defined to follow some or all of the following rules.

Example #1

The ROOT SEQUENCE INDEX value for generation of the sequence of the PSSS may be defined to use a value defined for an IN-COVERAGE (hereinafter referred to as IC). In one example, the PSSS ROOT SEQUENCE INDEX value for the IC may be defined as 26, and the PSSS ROOT SEQUENCE INDEX value for the OOC may be defined as 37.

When such a rule is applied, the D2D Relay communication related PSSS transmitted by DRUE #N using CARRIER #Y may be regarded as the PSSS transmitted by the IC D2D UE in terms of OOC D2D UE #K. At this time, the PSSS transmission may be configured to be performed using IC SSS TRANSMISSION RESOURCE (or OSS SSS TRANSMISSION RESOURCE or D2D RELAY communication related SSS TRANSMISSION RESOURCE).

Example #2

The SIDELINK SYNCHRONIZATION IDENTITY (ID) value for generation of the sequence of the SSSS can be defined to use a value defined for in-coverage (IC). That is, the value of the specific ID used for generating the sequence of the SSSS is defined for and between the in-coverage purpose and the out-coverage purpose. When the DRUE #N transmits the D2D Relay communication related SSSS using the CARRIER #Y, ID for IC may be used. Here, in one example, the SIDELINK SYNCHRONIZATION ID value for IC is defined as {0, 1, . . . , 167} (see id_net in Table 1). The SIDELINK SYNCHRONIZATION ID value for OOC is {168, 169, . . . , 335} (see id_oon in Table 1).

When this rule is applied, the D2D RELAY communication related SSSS that DRUE #N transmits using CARRIER #Y may be regarded as the SSSS transmitted by the IC D2D UE in terms of OOC D2D UE #K. Further, in one example, when this (example #2) is applied, the SSSS transmission may be configured to be performed using the IC SSS TRANSMISSION RESOURCE (or OOC SSS TRANSMISSION RESOURCE or D2D RELAY communication related SSS TRANSMISSION RESOURCE).

Example #3

The CONTENTS transmitted through the PSBCH includes at least one of, in one example, DFN (D2D (SUB) FRAME NUMBER), TDD UL-DL CONFIGURATION, IN-COVERAGE INDICATOR, SIDELINK SYSTEM BANDWIDTH and RESERVED FIELD. Among these, if the IN-COVERAGE INDICATOR has a specific value (in one example, '1'), it may notify that the PSBCH is a D2D signal transmitted from the IC D2D UE. When DRUE #N may transmit the D2D Relay communication related PSBCH using CARRIER #Y, the DRUE #N may set the IN-COVERAGE INDICATOR to '1'. In this case, the D2D Relay communication related PSBCH transmitted by DRUE #N using CARRIER #Y may be regarded as the PSBCH transmitted by the IC D2D UE in view of the OOC D2D UE #K.

In another example, by setting the RESERVED FIELD in the CONTENTS transmitted via the PSBCH to a predefined value, the PSBCH may be defined to be interpreted as the PSBCH transmitted by the D2D RELAY UE (or (REL-13) IC D2D UE) in terms of OOC D2D UE #K.

Also, in one example, when this (example #3) is applied, the PSBCH transmission may be configured to be performed using the IC SSS TRANSMISSION RESOURCE (or OOC SSS TRANSMISSION RESOURCE or D2D RELAY communication related SSS TRANSMISSION RESOURCE).

Example #4

Through predefined signaling, DRUE #N may be informed which CARRIER is the MEA_CARRIER of CARRIER #Y.

In one example, if MEA_CARRIER of CARRIER #Y is set (or signaled) to DL CARRIER #X, DRUE #N is allowed to configure/transmit the D2D RELAY communication related SSS and/or PSBCH transmitted using CARRIER #Y in the same manner as in IC. Here, in one example, the corresponding SSS and/or PSBCH transmission may be configured to be performed using the IC SSS TRANSMISSION RESOURCE (or OSS SSS TRANSMISSION RESOURCE or D2D RELAY communication related SSS TRANSMISSION RESOURCE).

On the other hand, if MEA_CARRIER of CARRIER #Y is not set (or signaled) (or MEA_CARRIER of CARRIER #Y is not set (or signaled) to DL CARRIER #X), DRUE #N is allowed to configure/transmit the D2D RELAY communication related SSS and/or PSBCH transmitted using CARRIER #Y in the same manner as in OCC.

Here, in one example, the corresponding SSS and/or PSBCH transmission may be configured to be performed using an OCC SSS TRANSMISSION RESOURCE (or IC SSS TRANSMISSION RESOURCE or D2D RELAY communication related SSS TRANSMISSION RESOURCE). In another example, a transmission operation using CARRIER #Y may be determined based on MEASUREMENT and S-CRITERION satisfaction for MEA_CARRIER of the CARRIER #Y, as designated via the MEA_CARRIER setting related signaling (in one example, ROOT SEQUENCE INDEX for generating a PSSS sequence and/or SIDELINK SYNCHRONIZATION ID for SSSS sequence generation may be determined based on determination about whether it is IC or OCC).

Figure 10:
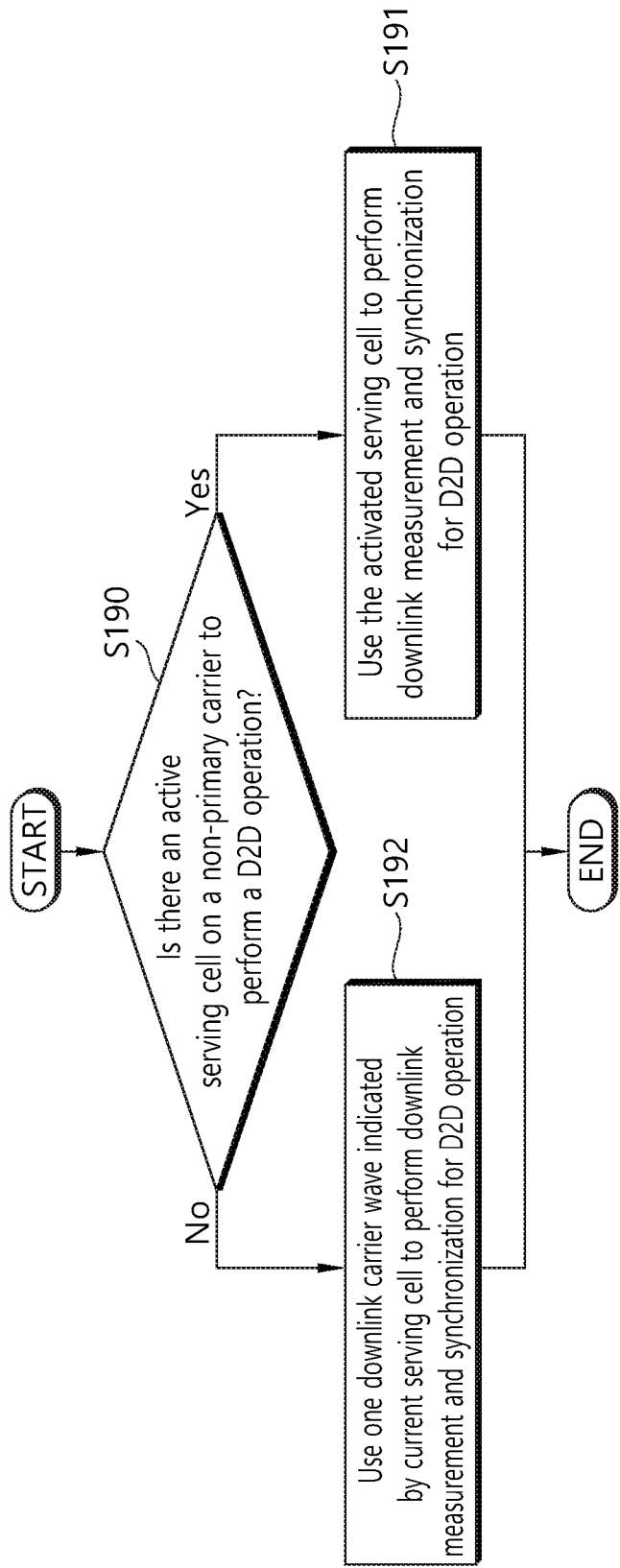
FIG. 10 illustrates a specific method using the example #4 above.

FIG. 10 illustrates a specific method using the example #4 above.

Referring to FIG. 10, the user device (DRUE #N) determines whether there is an active serving cell on a non-primary carrier that is not a primary carrier to perform a D2D operation (S190). In one example, suppose that the user device has an RRC connection state with a specific base station using DL carrier #X, and UL carrier #X, and wants to transmit a D2D discovery signal using the carrier #Y. In this case, the user device determines whether or not there is an activated serving cell on the carrier #Y.

If there is a serving cell activated on the non-primary carrier, the user device uses the activated serving cell for downlink measurement and synchronization for D2D operation (S191).

On the other hand, if there is no serving cell activated on the non-primary carrier, the user device uses one downlink carrier indicated by the current serving cell (base station) for downlink measurement and synchronization for D2D operation (S192). The one downlink carrier may be a DL carrier (e.g., a DL carrier linked by system information) that is one of a pair of carriers via which the user device performs the D2D operation (e.g., D2D discovery signal transmission) or may be a DL carrier without this limitation (that is, a DL carrier that is not linked by system information).

Figure 11:
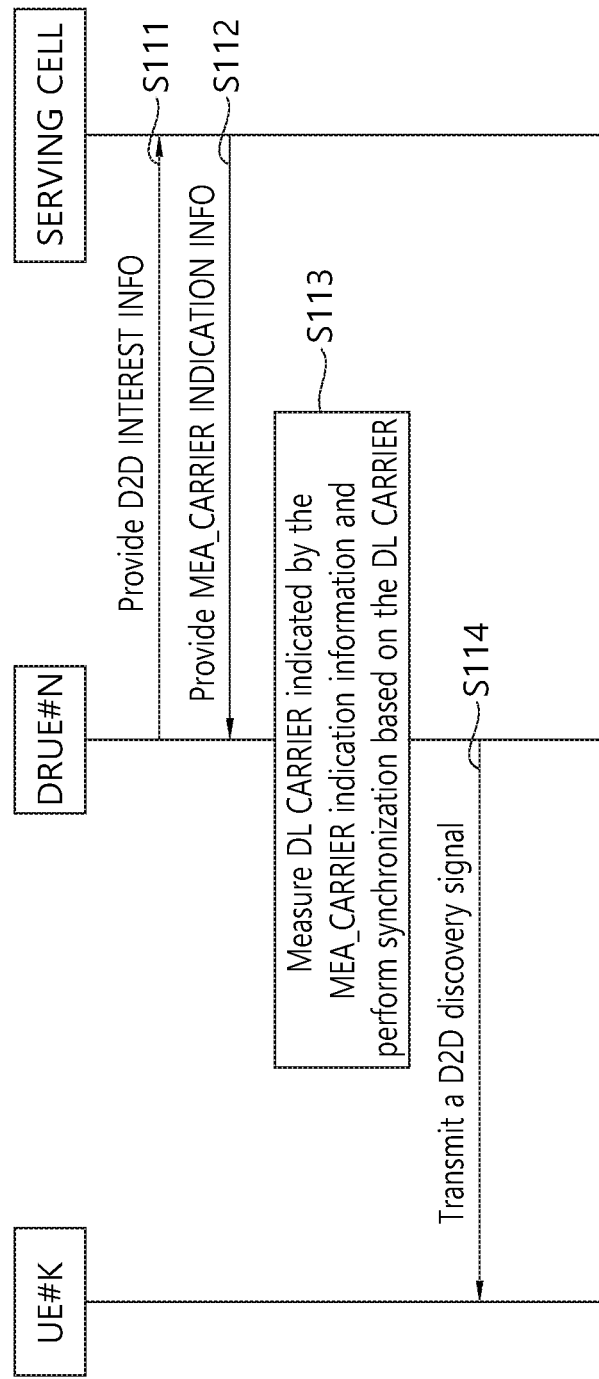
FIG. 11 illustrates a method of transmitting a D2D discovery signal by the user device according to an embodiment of the present invention.

FIG. 11 illustrates a method of transmitting a D2D discovery signal by the user device according to an embodiment of the present invention.

Referring to FIG. 11, DRUE #N transmits D2D INTEREST information to a serving cell (base station) (S111). The D2D INTEREST information may be information that informs the serving cell that DRUE #N is interested in D2D operation on a particular carrier. In one example, DRUE #N may inform the serving cell that it is interested in transmitting a D2D discovery signal using CARRIER #Y rather than DL CARRIER #X, and UL CARRIER #X, which are carriers that are performing WAN communication with the serving cell. The D2D INTEREST information may be provided separately from the capability information of the user device (UE CAPABILITY INFORMATION) or included in the user device capability information.

The serving cell provides MEA_CARRIER indication information indicating the measured carrier (MEA_CARRIER) to DRUE #N (S112). In the above example, DRUE #N may be informed that MEA_CARRIER for CARRIER #Y is DL CARRIER #X.

DRUE #N may measure the DL CARRIER indicated by the MEA_CARRIER indication information and perform synchronization based on the DL CARRIER (S113). Here, it may be assumed that there is no active serving cell using CARRIER #Y for DRUE #N. If there is an active serving cell using CARRIER #Y for DRUE #N, then the activated serving cell is used for downlink measurement and synchronization for D2D operation.

DRUE #N transmits a D2D discovery signal to UE #K based on the downlink measurement and synchronization (S114). As an additional example, DRUE #N may perform coverage-in/out determination for the DL CARRIER #X, to thereby use either the D2D parameter in coverage or the D2D parameter outside of coverage for the D2D operation using CARRIER #Y.

Example #5

The UE may be configured to configure/transmit the D2D RELAY communication related SSS and/or PSBCH according to some or all of the following rules.

1) The ROOT SEQUENCE ID for generating the sequence of PSSS and/or the SIDELINK SYNCHRONIZATION ID for SSSS sequence generation use what is defined for the OOC purpose, but the RESERVED FIELD in the CONTENTS transmitted through PSBCH is set to the predefined value (or IN-COVERAGE INDICATOR is set to 1). Thus, it may be interpreted from the point of view of the OOC D2D UE #K that the corresponding D2D RELAY communication related SSS and/or PSBCH is transmitted from D2D RELAY UE or (REL-13) IC D2D UE.

As another example, the ROOT SEQUENCE ID for generating the sequence of PSSS and/or the SIDELINK SYNCHRONIZATION ID for SSSS sequence generation use what is defined for the IC purpose, and the RESERVED FIELD in the CONTENTS transmitted through PSBCH is set to the predefined value (or IN-COVERAGE INDICATOR is set to 0). Thus, it may be interpreted from the point of view of the OOC D2D UE #K that the corresponding D2D RELAY communication related SSS and/or PSBCH is transmitted from D2D RELAY UE or (REL-13) IC D2D UE.

2) The ROOT SEQUENCE ID for generating the sequence of PSSS and/or the SIDELINK SYNCHRONIZATION ID for SSSS sequence generation use what is defined for the IC purpose, and the IN-COVERAGE INDICATOR in the CONTENTS transmitted through PSBCH is set to 1 (or the RESERVED FIELD is set to the predefined value). Thus, it may be interpreted from the point of view of the OOC D2D UE #K that the corresponding D2D RELAY communication related SSS and/or PSBCH is transmitted from D2D RELAY UE or (REL-13) IC D2D UE.

3) As another example, the ROOT SEQUENCE ID for generating the sequence of PSSS and/or the SIDELINK SYNCHRONIZATION ID for SSSS sequence generation use what is defined for the IC (or OOC) purpose, and the SIDELINK SYNCHRONIZATION ID (see Table 1) used for the initialization of the PSBCH SCRAMBLING SEQUENCE GENERATOR may be defined to use (or substitute) a pre-configured (or signaled) D2D RELAY communication-related SIDELINK SYNCHRONIZATION ID value.

Here, in one example, the DID Relay communication-related SIDELINK SYNCHRONIZATION ID value may be set (or signaled) to one of the SIDELINK SYNCHRONIZATION IDs (e.g., {168, 169, . . . , 335}) for OCC (See id_oon in Table 1) or may be set (or signaled) to one of the SIDELINK SYNCHRONIZATION IDs for IC (e.g., {0, 1, . . . , 167} (See id_net in Table 1).

Example #6

The SIDELINK SYNCHRONIZATION ID used in the determination of the ROOT SEQUENCE INDEX related to the PSSS sequence generation and/or the SIDELINK SYNCHRONIZATION ID used for generating the SSSS sequence (see Table 1) may be configured to use (or substitute) the SIDELINK SYNCHRONIZATION ID value (e.g., {168, 169, . . . , 335} (see id_oon in Table 1) as preconfigured or pre-signaled for OOC. Here, in one example, a rule may be defined to pre-signal (or preset) SSS (and/or PSBCH) transmission related resources. When such a rule is applied, in one example, DRUE(s) that transmits a D2D RELAY communication related SSS (and/or PSBCH) using CARRIER #Y may be configured to use the same SIDELINK SYNCHRONIZATION ID for PSSS and/or SSSS sequence generation and/or PSBCH SCRAMBLING SEQUENCE GENERATOR initialization.

In addition, such a rule causes the UE performing the OUTBAND D2D RELAY to transmit the PSSS and/or SSSS sequence for the OOC purpose. However, the SIDELINK SYNCHRONIZATION ID and the resources (related to the PSSS and/or SSSS transmission) may be interpreted to be signaled from the base station. In addition, if such a rule applies, in one example, DRUE(s) that transmits a D2D RELAY communication related SSS (and/or PSBCH) using CARRIER #Y may be configured to transmit the D2D Relay communication related SSS (and/or PSBCH) using the same resources. As another example, the SIDELINK SYNCHRONIZATION ID used for determination of the ROOT SEQUENCE INDEX related to the PSSS sequence generation and/or the SIDELINK SYNCHRONIZATION ID used for the SSSS sequence generation may be configured to use (or substitute) the SIDELINK SYNCHRONIZATION ID value (e.g., {0, 1, . . . , 167} (see id_net in Table 1) as preconfigured or pre-signaled for IC.

In one example, if the OOC D2D UE #K receives from the DRUE #N, a SSS and/or a PSBCH to which some or all rules of the above-described [the present Method #1] are applied, the corresponding D2D Relay communication related SSS and/or PSBCH may be defined to have SYNCHRONIZATION SOURCE SELECTION PRIORITY higher than those received from other OOC D2D UEs using the CARRIER #Y (or may be defined to have PRIORITY higher than those received from other OOC D2D UEs using the CARRIER #Y in terms of D2D Relay communication related SSS and/or PSBCH and/or DATA and/or DISCOVERY receipt).

As another example, if the OOC D2D UE #K receives from the DRUE #N, a SSS and/or a PSBCH to which some or all rules of the above-described [the present Method #1] are applied, the corresponding D2D Relay communication related SSS and/or PSBCH may be defined to have SYNCHRONIZATION SOURCE SELECTION PRIORITY higher than those received from other OOC D2D UEs using the CARRIER #Y but to have SYNCHRONIZATION SOURCE SELECTION PRIORITY higher than those received from other IC D2D UEs using the CARRIER #Y. Here, in one example, these rules may be applicable to following cases: 1) case when there are base stations performing WAN communication based on CARRIER #Y and, thus, PARTIAL COVERAGE SCENARIO may occur; 2) a case in which when DRUE #N configures/transmits the D2D RELAY communication-related SSS and/or PSBCH, the ROOT SEQUENCE ID for generating the sequence of PSSS and/or the SIDELINK SYNCHRONIZATION ID for SSSS sequence generation use what is defined for the IC purpose, and the IN-COVERAGE INDICATOR in the CONTENTS transmitted through PSBCH is set to 0 (or the RESERVED FIELD is set to the predefined value).

As another example, if DRUE #N is performing D2D communication using UL CARRIER #X as well as CARRIER #Y, a rule may be configured such that the D2D transmission (TX) operation (and/or D2D reception (RX) operation) using CARRIER #X may have a higher PRIORITY than the D2D transmission (TX) operation (and/or D2D reception (RX) operation) using CARRIER #Y. Here, in one example, the application of such a rule may result in interpretation that IC D2D TX operation (and/or IC D2D RX operation) (that is, D2D communication using UL CARRIER #X) has a higher priority than D2D RELAY communication using CARRIER #Y.

As further example, if DRUE #N does not have the capability to simultaneously perform D2D communication using UL CARRIER #X and CARRIER #Y, the D2D RELAY communication (or D2D RELAY operation) using CARRIER #Y may be suppressed during a period in which D2D communication is performed using UL CARRIER #X.

As another example, if DRUE #N is performing D2D communication using UL CARRIER #X as well as CARRIER #Y, a rule may be configured such that the D2D transmission (TX) operation (and/or D2D reception (RX) operation) using CARRIER #Y may have a higher PRIORITY than the D2D transmission (TX) operation (and/or D2D reception (RX) operation) using CARRIER #X. In one example, if DRUE #N does not have the capability to simultaneously perform D2D communication using UL CARRIER #X and CARRIER #Y, the D2D RELAY communication (or D2D RELAY operation) using CARRIER #X may be suppressed during a period in which D2D communication is performed using UL CARRIER #Y. This rule may be applied only to following cases: a case when the MEA_CARRIER of CARRIER #Y is set to DL CARRIER #X through predefined signaling, or a case when the DRUE #N relays (system) information of a base station performing WAN communication based on DL CARRIER #X using the CARRIER #Y.

In another example, the DRUE may use the predefined method (or rule) to indicate the presence thereof to other D2D OOC UEs, even though the DRUE does not have the information to be transmitted to other D2D OOC UEs (or PSCCH (PHYSICAL SIDELINK CONTROL CHANNEL)/ PSSCH (PHYSICAL SIDELINK SHARED CHANNEL)). In this way, the OOC D2D UE can detect the corresponding DRU and transmit DATA thereto to support (or perform) the RELAY operation with the network. Here, in one example, DRUE may announce its existence to the other D2D OOC UEs by sending a predefined special PSCCH and/or SSS (for a pre-defined (or signaled) time/period, even though the DRUE does not have the information to be transmitted to other D2D OOC UEs (or PSCCH (PHYSICAL SIDELINK CONTROL CHANNEL)/PSSCH (PHYSICAL SIDELINK SHARED CHANNEL)). Here, in one example, a group destination ID field (GROUP DESTINATION ID FIELD) on the corresponding PSCCH may be set to the predetermined (or signaled) special value. In particular, in one example, the proposed scheme may be applicable not only to OUTBAND D2D RELAY but also to INBAND D2D RELAY. Here, the INBAND RELAY may be defined as a repeater when the link between the base station and the repeater and the link between the repeater and the user device share the same carrier frequency.

As another example, DRUE may be configured to send the predefined special PSCCH (for a predefined (or signaled) time/period) regardless of traffic, thereby to ensure that DRUE may reliably send SSS (for the predefined (or signaled) time/period). Here, in one example, the GROUP DESTINATION ID FIELD on the PSCCH may be set to a predefined (or signaled) specific value. As another example, DRUE may be configured to perform an SSS transmission for a predefined (or signaled) time/period even though there is no information to be transmitted to other D2D OOC UEs (or PSCCH/PSSCH).

As another example, when DRUE #N performs D2D RELAY communication (or D2D communication) using CARRIER #Y based on some or all of the above-described suggested rules, some or all information in the following examples #A to #E may be defined such that they are set (or assumed) to be the same as those for MEA_CARRIER of CARRIER #Y (or a predefined or signaled specific CARRIER, wherein WAN DL communication may be performed using the specific CARRIER).

Example #A

DFN (D2D frame number) information. Among the PSBCH CONTENTS transmitted using CARRIER #Y, the DFN field may be set equally to the SFN (SYSTEM (SUB) FRAME NUMBER) of the corresponding MEA_CARRIER. In this case, the D2D RELAY communication (or D2D communication) related time/frequency synchronization using CARRIER #Y may be interpreted as equal to that for the MEA_CARRIER.

Example #B

TDD UL-DL CONFIGURATION information. If the MEA_CARRIER of CARRIER #Y is an FM CARRIER, the TDD UL-DL CONFIGURATION field in the PSBCH CONTENTS transmitted using CARRIER #Y is set to '000'. If MEA_CARRIER of CARRIER #Y is TDD CARRIER, the TDD UL-DL CONFIGURATION field in the PSBCH CONTENTS transmitted using CARRIER #Y may be set to equally point to the TDD UL-DL CONFIGURATION of the corresponding MEA_CARRIER. In another example, the TDD UL-DL CONFIGURATION field in the PSBCH CONTENTS transmitted using CARRIER #Y may be a FDD CARRIER (/BAND) or a CARDER_CONDITION field may be configured such that the corresponding TDD UL-DL CONFIGURATION field value is determined depending on whether the CARRIER #Y is a TDD CARRIER (/BAND) or FDD CARRIER (/BAND), regardless of whether the MEA_CARRIER is a FDD CARRIER or a TDD CARRIER.

In another example, if the TDD UL-DL CONFIGURATION field in the PSBCH CONTENTS transmitted using CARRIER #Y indicates a TDD system (or (actual) TDD UL-DL CONFIGURATION) according to the proposed rule, interworking/matching relationship between the TIME RESOURCE PATTERN field value on the PSCCH (SCI FORMAT 0) and the SUBFRAME INDICATOR BITMAP, which determines the time resolution pattern of the (MODE1) PSSCH transmitted using CARRIER #Y may be defined with reference to TABLE defined for performing D2D communication on the TDD system (as defined in the 3GPP TS 36.213 specification). To the contrary, if the TDD UL-DL CONFIGURATION field in the PSBCH CONTENTS transmitted using CARRIER #Y indicates FDD system (i.e., '000'), the interworking/matching relationship between the TIME RESOURCE PATTERN field value on the PSCCH (SCI FORMAT 0) and the SUBFRAME INDICATOR BITMAP, which determines the time resolution pattern of the (MODE1) PSSCH transmitted using CARRIER #Y may be defined with reference to TABLE defined for performing D2D communication on the FDD system (as defined in the 3GPP TS 36.213 specification). In still another example, if the TDD UL-DL CONFIGURATION field in the PSBCH CONTENTS transmitted using CARRIER #Y indicates (actual) TDD UL-DL CONFIGURATION or TDD system according to the proposed rule, the TIME RESOURCE PATTERN candidates (i.e., 'ITRP' [1]) of MODE2 PSSCH may be defined to assume (or refer to) those matching the corresponding TDD UL-DL CONFIGURATION. To the contrary, if the TDD UL-DL CONFIGURATION field in the PSBCH CONTENTS transmitted using CARRIER #Y indicates FDD system (i.e., '000'), the TIME RESOURCE PATTERN candidates (i.e., 'ITRP' [1]) of MODE2 PSSCH may be defined to assume (or refer to) those matching the corresponding FDD UL-DL CONFIGURATION.

Example #C

IN-COVERAGE INDICATOR information. Among the PSBCH CONTENTS transmitted using CARRIER #Y, the IN-COVERAGE INDICATOR field may be set according to the IN/OOC status for the corresponding MEA_CARRIER.

Example #D

CARRIER #Y's MEA_CARRIER (or a predefined (or signaled) specific CARRIER (to which WAN DL communication is performed) and PAIRED UL CARRIER related DISCOVERY and/or COMMUNICATION and/or SSS/ PSBCH transmission (and/or receiving) related RESOURCE POOL setting information.

Example #E

Time (or subframe or radio frame) (and/or frequency) synchronization. As another example, the rule may be defined to (always) synchronize time (or subframe or radio frame) to PCell (or RELAY communication related SCI FORMAT 0 (D2D GRANT) transmission related SCHEDULING CELL (i.e., MODE 1)) regardless of MEA_CARRIER.

As another example, a rule may be defined such that regardless of whether MEA_CARRIER of CARRIER #Y is a TDD/FDD CARRIER, at least one of the TDD UL-DL CONFIGURATION field, the DFN field, the IN-COVERAGE INDICATOR field, the SIDELINK SYSTEM BANDWIDTH, and the RESERVED FIELDs in the PSBCH CONTENTS transmitted using CARRIER #Y may be set (or fixed) to a predefined (or signaled) value Here, as an example of the application of the proposed scheme, the TDD UL-DL CONFIGURATION field in the PSBCH CONTENTS transmitted using CARRIER #Y may be set or fixed to a predefined (or signaled) '000' is. In this case, CARRIER #Y may be interpreted as a (virtual) FDD UL CARRIER. As another example, a rule may be defined such that when DRUE #N performs D2D RELAY communication (based on MODE1) using CARRIER #Y, it transmits SCI FORMAT 0 (D2D GRANT) (related to RELAY communication) based on CROSS CARRIER SCHEDULING using other CARRIERs.

As another example, when the D2D UE #X performs D2D communication using a preset (or signaled) CARRIER #T and CARRIER #F, if the CARRIER #F is considered (or determined) for OOC and the CARRIER #T is considered (or determined) for IC, transmission of at least one of SSS, PSBCH, PSCCH, PSSCH, and PSDCH (PHYSICAL SIDELINK DISCOVERY CHANNEL) using CARRIER #F may be done according to some or all of the following rules/assumptions. Here, in one example, CARRIER #F may be interpreted as a CARRIER dedicated to V2V communication (VEHICLE TO VEHICLE communication, which may be interpreted as direct communication between vehicles). Also, by way of example, these rules/assumptions may be used only when D2D UE #X does not perform D2D RELAY communication (using CARRIER #F) (or if D2D UE #X is not set to DRUE using CARRIER #F).

Example #A

The SIDELINK SYNCHRONIZATION ID used in the determination of the ROOT SEQUENCE INDEX related to the generation of the PSSS sequence transmitted using CARRIER #F, and/or the SIDELINK SYNCHRONIZATION ID (see Table 1) used for generating the SSSS sequence may be configured to use SIDELINK SYNCHRONIZATION ID values (in one example, {168, 169, ..., 335} (see id_oon in Table 1) as pre-signaled (or preset) for OOC. Here, in one example, SSS (and/or PSBCH) transmission related resources may also be pre-signaled (or preset). If such a rule applies, in one example, a D2D UE(s) that transmits an SSS (and/or PSBCH) (related to V2V communication) using CARRIER #F (for V2V communication only) may be configured to use the same SIDELINK SYNCHRONIZATION ID for generation of PSSS and/or SSSS sequence (and/or for initialization of the PSBCH SCRAMBLING SEQUENCE GENERATOR). In addition, if such a rule applies, in one example, a D2D UE(s) that transmits an SSS (and/or PSBCH) (related to V2V communication) using CARRIER #F (for V2V communication only) may be configured to transmit the corresponding SSS (and/or PSBCH) using the same resources. In another example, the SIDELINK SYNCHRONIZATION ID used in the determination of the ROOT SEQUENCE INDEX related to the generation of the PSSS sequence transmitted using CARRIER #F, and/or the SIDELINK SYNCHRONIZATION ID used for generating the SSSS sequence may be configured to use SIDELINK SYNCHRONIZATION ID values (in one example, {0, 1, ..., 167} (see id_net in Table 1) as pre-signaled (or preset) for IC.

Example #B

Some or all of the following information (that is, at least one of the examples #B-1 to #B-5 to be described later) relating to the pre-established (or pre-signaled) CARRIER (referred to as 'REF_CARRIER') may be equally applied to the transmission of at least one of the SSS, PSBCH, PSCCH, PSSCH and PSDCH using the CARRIER #F. For example, REF_CARRIER may be defined as a PCell or a SCHEDULING CELL (i.e., MODE 1) associated with (V2V communication-related) SCI FORMAT 0 (D2D GRANT) transmission regardless of whether it is MEA_CARRIER of CARRIER #F or UL CARRIER paired with MEA_CARRIER of CARRIER #T (or a predefined (or signaled) specific CARRIER (via which WAN DL communication is performed)).

Example #B-1

DFN information. Here, in one example, among the PSBCH CONTENTS transmitted using CARRIER #F, the DFN field may be set equally to the SFN (SYSTEM (SUB) FRAME NUMBER) of the corresponding REF_CARRIER. In this case, the D2D communication related time (/frequency) synchronization using CARRIER #F may be interpreted as being equal to that using the REF_CARRIER.

Example #B-2

TDD UL-DL CONFIGURATION information. For example, if REF_CARRIER of CARRIER #F is FDD CARRIER, the TDD UL-DL CONFIGURATION field in PSBCH CONTENTS transmitted using CARRIER #F is set to '000'. When REF_CARRIER of CARRIER #F is TDD CARRIER, the TDD UL-DL CONFIGURATION field in PSBCH CONTENTS transmitted using CARRIER #F may be set to equally point to the TDD UL-DL CONFIGURATION of the corresponding REF_CARRIER. As another example, the TDD UL-DL CONFIGURATION field in the PSBCH CONTENTS transmitted using CARRIER #F may be configured such that the corresponding TDD UL-DL CONFIGURATION field value is determined based on whether CARRIER # is a FDD CARRIER (BAND) or a TDD CARRIER (BAND) regardless of whether the REF_CARRIER is an FDD CARRIER or a TDD CARRIER. As another example, if the TDD UL-DL CONFIGURATION field in PSBCH CONTENTS transmitted using CARRIER #F indicates a TDD system (or (actual) TDD UL-DL CONFIGURATION) according to the proposed rule, interworking/matching relationship between the TIME RESOURCE PATTERN field value on the PSCCH (SCI FORMAT 0) and the SUBFRAME INDICATOR BITMAP, which determines the time resolution pattern of the (MODE1) PSSCH transmitted using CARRIER #Y may be defined with reference to TABLE defined for performing D2D communication on the TDD system (as defined in the 3GPP TS 36.213 specification). To the contrary, if the TDD UL-DL CONFIGURATION field in PSBCH CONTENTS transmitted using CARRIER #F indicates a FDD system (i.e., '000'), the interworking/matching relationship between the TIME RESOURCE PATTERN field value on the PSCCH (SCI FORMAT 0) and the SUBFRAME INDICATOR BITMAP, which determines the time resolution pattern of the (MODE1) PSSCH transmitted using CARRIER #Y may be defined with reference to TABLE defined for performing D2D communication on the FDD system (as defined in the 3GPP TS 36.213 specification). In still another example, if the TDD UL-DL CONFIGURATION field in the PSBCH CONTENTS transmitted using CARRIER #Y indicates (actual) TDD UL-DL CONFIGURATION or TDD system according to the proposed rule, the TIME RESOURCE PATTERN candidates (i.e., 'ITRP' [1]) of MODE2 PSSCH may be defined to assume (or refer to) those matching the corresponding TDD UL-DL CONFIGURATION. To the contrary, if the TDD UL-DL CONFIGURATION field in the PSBCH CONTENTS transmitted using CARRIER #Y indicates FDD system (i.e., '000'), the TIME RESOURCE PATTERN candidates (i.e., 'ITRP' [1]) of MODE2 PSSCH may be defined to assume (or refer to) those matching the corresponding FDD UL-DL CONFIGURATION.

Example #B-3

IN-COVERAGE INDICATOR information. Here, for example, among the PSBCH CONTENTS transmitted using CARRIER #F, the IN-COVERAGE INDICATOR field may be set according to the IN/OOC status of the corresponding REF_CARRIER.

Example #B-4

RESOURCE POOL setting information related to REF_CARRIER related DISCOVERY and/or COMMUNICATION and/or SSS/PSBCH transmission (and/or reception).

Example #B-5

Time (or subframe or radio frame) (and/or frequency) synchronization. As another example, a rule may be defined to synchronize (always) time (or subframe or radio frame) to REF_CARRIER.

In the following, it is assumed that the user device performs D2D operation in CARRIER #X. When TIMING REFERENCE (CELL) associated with the D2D TX and/or D2D RX operation using CARRIER #X (for example, SCELL (or NON-PCELL) or NON-SERVING CELL) is set or signaled to PCELL (hereinafter referred to as REFER_CELL) (or other CARRIER (as pre-signaled or predefined) other than CARRIER #X and/or when the RESOURCE POOL information associated with the D2D TX and/or D2D RX operation using CARRIER #X is received (or CROSS-CARRIER-signaled) from the REFER_CELL other than the CARRIER #X, some or all of the following rules may be defined to be applied thereto.

That is, when the UE is set to comply with the time reference of a carrier other than the carrier wave CARRIER #X performing the D2D operation (more specifically, the time reference of a cell using the other carrier) or to receive the resource pool information from the cell using the other carrier wave, some or all of the following rules may be defined to be applied thereto. The cell using the other carrier providing the time reference or providing the resource pool information will be referred to as a reference cell (REFER_CELL) hereinafter. The rules to be described later may be defined to be limited to the user device in the RELL connection state in the PCELL and/or the user device in the RRC idle state in the PCELL.

(Rule 1-1) REFER_CELL indicates CARRIER #X-based OOC D2D communication related RESOURCE POOL information and SIDELINK SYNCHRONIZATION SIGNAL ID (SLSSID), together with CARRIER #X-based IN-COVERAGE (INC) D2D communication related RESOURCE POOL information and SLSSID information, and the like. This considers the possibility that D2D communication using CARRIER #X becomes OUT-OF-COVERAGE (OOC) from the viewpoint of D2D UE.

From the viewpoint of the D2D UE, when the D2D communication using the CARRIER #X becomes OOC, the UE follows (exceptionally) the (CARRIER #X based) TIMING in the OOC situation rather than the REFER_CELL based TIMING REFERENCE (and/or TA), and further, a rule may be defined to perform OOC D2D communication using CARRIER #X based on OOC D2D communication related RESOURCE POOL information and SLSSID received from the REFER_CELL. In an alternative, the UE may comply with REFER_CELL based TIMING REFERENCE (TA) or comply with both of REFER_CELL based TIMING REFERENCE and (CARRIER #X based) TA setting in an OOC situation, and, further, the rule may be defined to perform OOC D2D communication using CARRIER #X based on OOC D2D communication related RESOURCE POOL information and SLSSID received from the REFER_CELL. As another example, when a D2D communication using CARRIER #X is INC from the viewpoint of a D2D UE, the UE may comply with REFER_CELL based TIMING REFERENCE (TA) (or comply with both of REFER_CELL based TIMING REFERENCE and (CARRIER #X based) TA setting in an OOC situation), and, further, the rule may be defined to perform INC D2D communication using CARRIER #X based on INC D2D communication related RESOURCE POOL information and SLSSID received from the REFER_CELL.

(Rule 1-2) REFER_CELL indicates D2D UE of at least one of common RESOURCE POOL information and SLSSID information to be commonly used for OOC D2D communication and INC D2D communication using the CARRIER #X. Thus, D2D UE may perform at least one of CARRIER #X-based OOC D2D communication and INC D2D communication based on the indicated RESOURCE POOL information and SLSSID information.

In one example, if a D2D communication using CARRIER #X is OOC from a viewpoint of an D2D UE, the UE follows (exceptionally) the (CARRIER #X based) TIMING in the OOC situation rather than the REFER_CELL based TIMING REFERENCE (and/or TA), and further, the UE may perform OOC D2D communication using CARRIER #X based on (common) D2D communication related RESOURCE POOL information and SLSSID received from the REFER_CELL. In an alternative, the UE may comply with REFER_CELL based TIMING REFERENCE (TA) or comply with both of REFER_CELL based TIMING REFERENCE and (CARRIER #X based) TA setting in an OOC situation, and, further, the UE may perform OOC D2D communication using CARRIER #X based on (common) D2D communication related RESOURCE POOL information and SLSSID received from the REFER_CELL. As another example, when a D2D communication using CARRIER #X is INC from the viewpoint of a D2D UE, the UE may comply with REFER_CELL based TIMING REFERENCE (TA) (or comply with both of REFER_CELL based TIMING REFERENCE and (CARRIER #X based) TA setting in an OOC situation), and, further, the UE may perform INC D2D communication using CARRIER #X based on (common) D2D communication related RESOURCE POOL information and SLSSID received from the REFER_CELL.

On the other hand, when the NON-SERVING CELL (and/or SCELL) performing D2D TX (/RX) operation is determined (or assumed) to be IN-COVERAGE, frequency synchronization and/or time synchronization related to D2D TX (/RX) operation in the NON-SERVING CELL may be done in accordance with all or some of the following rules.

Here, it is assumed that the SERVING CELL (and/or PCELL) and the NON-SERVING CELL (and/or SCELL) use (or belong to) different CARRIERs. In addition, some or all of the following rules may apply only to a case when CARRIER associated with the NON-SERVING CELL (and/or SCELL) and CARRIER associated with SERVING CELL (and/or PCELL) have INTER-BAND (and/or INTRA-BAND CONTIGUOUS and/or INTRA-BAND NON-CONTIGUOUS) relationship.

Figure 12:
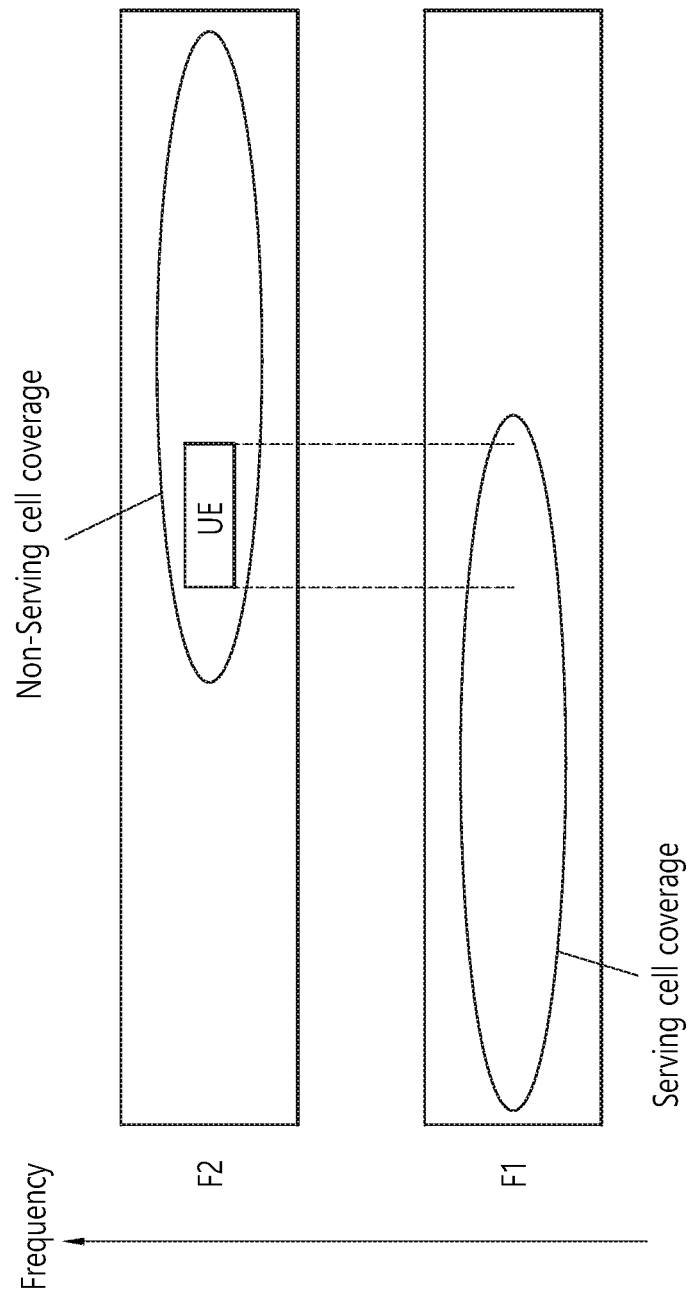
FIG. 12 illustrates a situation in which the user device performs a D2D operation.

FIG. 12 illustrates a situation in which the user device performs a D2D operation.

Referring to FIG. 12, the user device may be required to perform a D2D operation at the F2 frequency while having a specific cell serving as a serving cell (or PCELL) at F1 frequency. The user device may be located within the coverage of the NON-SERVING CELL (or SCELL) at F2 frequency. The NON-SERVING CELL (or SCELL) at the F2 frequency may be referred to as an IN-COVERAGE NON-SERVING CELL (or IN-COVERAGE SCELL).

In the situation described in FIG. 12, when the user device attempts to perform the D2D operation, how to control frequency synchronization and time synchronization is an issue. Hereinafter, this issue will be described in detail.

(Rule #A-1) In performing the D2D operation (D2D transmission or D2D reception), the user device adjusts frequency synchronization and time synchronization according to predefined rules (or signaled information) and then transmits D2D signals. The user device may apply frequency synchronization related to D2D TX (/RX) operation on the corresponding NON-SERVING CELL (and/or SCELL) according to IN-COVERAGE NON-SERVING CELL (and/or SCELL). In addition, the D2D TX (/RX) operation time synchronization on the corresponding non-serving cell (and/or SCELL) may be (further) applied or assumed according to the IN-COVERAGE NON-SERVING CELL (and/or SCELL).

(Rule #A-2) The user device may apply or assume synchronization of the D2D TX (/RX) operation on the corresponding NON-SERVING CELL (and/or SCELL) according to the IN-COVERAGE NON-SERVING CELL. In this connection, frequency synchronization may be defined to follow PCELL (and/or SERVING CELL). That is, in FIG. 12, the user device adjusts the frequency synchronization according to the serving cell (PCELL) at the F1 frequency, adjusts the time synchronization according to the NON-SERVING CELL at the F2 frequency, and then performs the D2D operation.

Figure 13:
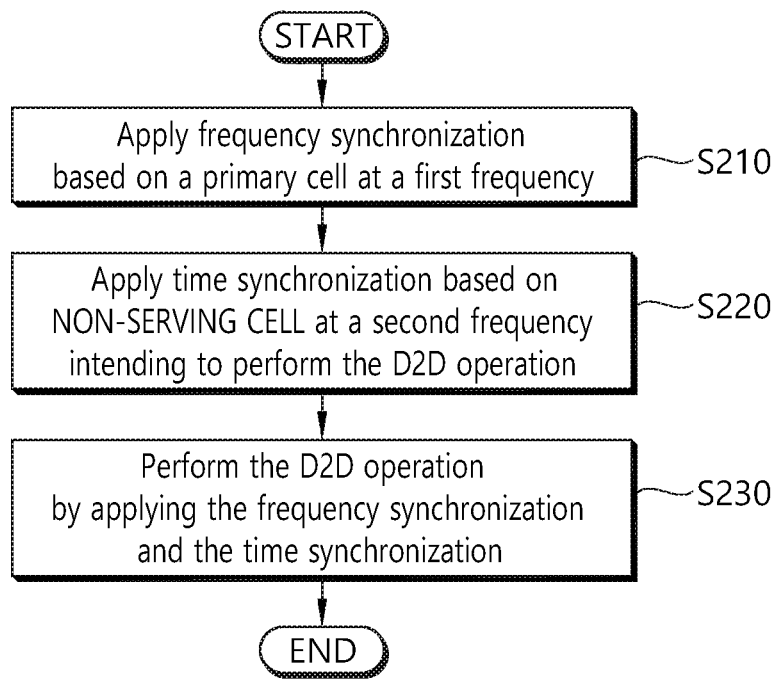
FIG. 13 is a method for performing the D2D operation by the user device when Rule #A-2 is applied.

FIG. 13 is a method for performing the D2D operation by the user device when Rule #A-2 is applied.

Referring to FIG. 13, the user device applies frequency synchronization based on a primary cell (or serving cell) at a first frequency (S210). The user device applies time synchronization based on the NON-SERVING CELL (or SCELL) at the second frequency F2 intending to perform the D2D operation (S220).

The user device performs the D2D operation by applying the frequency synchronization and the time synchronization (S230).

For example, the user device, which is in the RRC connection state with a specific cell at frequency #1 as the PCELL (or serving cell), desires to perform the D2D operation at frequency #2. In this connection, the cells at the frequency #2 may be NON-SERVING CELL (or SCELL) for the user device. The user device may be within the coverage of the NON-SERVING CELL (or SCELL). In this case, the user device adjusts the frequency synchronization for the D2D operation based on the PCELL (or serving cell) and adjusts the time synchronization based on the NON-SERVING CELL (or SCELL) at the frequency #2.

Rule #A-2 described above may be applied to a case when SEARCHING WINDOW SIZE (related to the corresponding NON-SERVING CELL) (or REFERENCE SYNCHRONIZATION WINDOW SIZE) is signaled (or indicated) to have W2 (<CP LENGTH) (that is, when the difference between the frequency (/time) synchronization according to the NON-SERVING CELL (and/or SCELL) and the frequency (/time) synchronization according to the PCELL (and/or SERVING CELL) is small).

Figure 14:
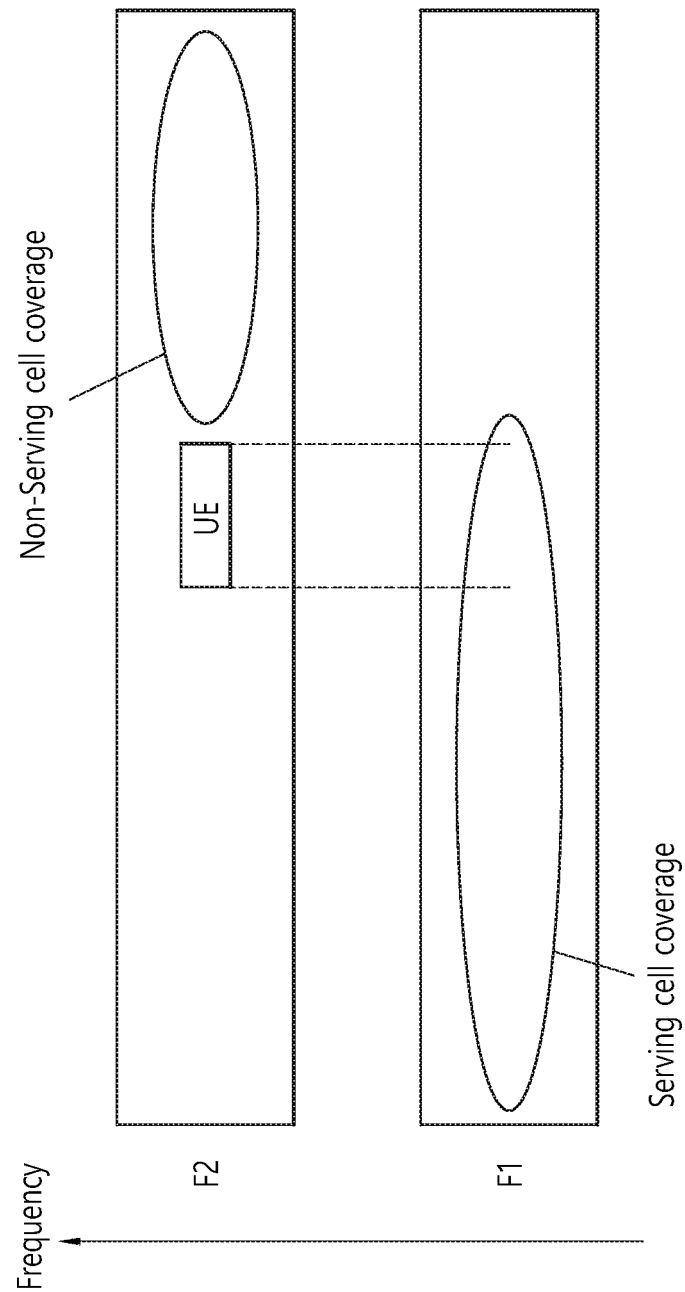
FIG. 14 illustrates another situation in which the user device performs D2D operation.

FIG. 14 illustrates another situation in which the user device performs D2D operation.

Referring to FIG. 14, the user device may be required to perform a D2D operation at the F2 frequency while having a specific cell serving as a serving cell (or PCELL) at F1 frequency. The user device may be located outside the coverage of the NON-SERVING CELL (or SCELL) at the F2 frequency. In this case, the NON-SERVING CELL (or SCELL) at the F2 frequency may be referred to as an OUT-COVERAGE NON-SERVING CELL (or OUT-COVERAGE SCELL).

When it is assumed that the NON-SERVING CELL (and/or SCELL) performing the D2D TX (/RX) operation is determined (or assumed) as OUT-COVERAGE, and the PCELL (and/or SERVING CELL) is IN-COVERAGE, the UE may apply frequency synchronization and/or time synchronization related to the D2D TX (/RX) operation in the corresponding NON-SERVING CELL (and/or SCELL) according to some or all of the following rules.

It is assumed that the SERVING CELL (and/or PCELL) and the NON-SERVING CELL (and/or SCELL) use (or belong to) different CARRIERs. Some or all of the following rules may apply only to a case when CARRIER associated with NON-SERVING CELL (and/or SCELL) and CARRIER associated with SERVING CELL (and/or PCELL) have INTER-BAND (and/or INTRA-BAND CONTIGUOUS and/or INTRA-CONTIGUOUS) relationship.

(Rule #B-1) A rule may be defined to apply frequency synchronization related to D2D TX(/RX) operation on the corresponding NON-SERVING CELL (and/or SCELL)) based on the IN-COVERAGE PCELL (and/or SERVING CELL). Here, as another example, a rule may be defined to apply time synchronization related to D2D TX(/RX) operation on the corresponding NON-SERVING CELL (and/or SCELL)) based on the IN-COVERAGE PCELL (and/or SERVING CELL). Here, in another example, if the corresponding D2D TX (/RX) UE has an OUT-COVERAGE UE on the OUT-COVERAGE NON-SERVING CELL as a SYNCHRONIZATION REFERENCE, a rule may be defined to apply frequency synchronization and time synchronization related to D2D TX (/RX) operation on the corresponding NON-SERVING CELL based on the OUT-COVERAGE UE (SLSS thereof). In an alternative, a rule may be defined to apply one of frequency synchronization and time synchronization related to D2D TX (/RX) operation on the corresponding NON-SERVING CELL based on the OUT-COVERAGE UE (SLSS thereof), and to apply the other of frequency synchronization and time synchronization related to D2D TX (/RX) operation on the corresponding NON-SERVING CELL based on the IN-COVERAGE PCELL (and/or SERVING CELL). Here, as another example, if the corresponding D2D TX (/RX) UE does not have an OUT-COVERAGE UE on the OUT-COVERAGE NON-SERVING CELL as a SYNCHRONIZATION REFERENCE (i.e., the D2D TX (/RX) UE itself is an independent SYNCHRONIZATION REFERENCE), frequency synchronization (and/or time synchronization) related to D2D TX (/RX) operation on the corresponding non-serving cell may be applied/assumed based on IN-COVERAGE PCELL. In an alternative, D2D TX (/RX) UE itself configures (applies) one of time synchronization and frequency synchronization) related to D2D TX (/RX) operation, and the other of D2D TX/RX operation related frequency synchronization and time synchronization) may be applied/assumed based on IN-COVERAGE PCELL.

The proposed schemes described above may be implemented independently, but may be implemented in the form of a combination of some of the proposed schemes. The above-described proposed schemes may be defined such that they are limitedly applied only to the FDD system (and/or TDD system) environment. The proposed schemes described above may be defined such that they are limited to MODE 2 COMMUNICATION and/or TYPE 1 DISCOVERY (and/or MODE 1 COMMUNICATION and/or TYPE 2 DISCOVERY). In addition, the above-described proposed schemes may be defined to be limited to the IN-COVERAGE D2D UE (and/or OUT-COVERAGE D2D UE) (and/or RRC_CONNECTED D2D UE (and/or RRC_IDLE D2D UE)). The proposed schemes described above may be defined to be limited to only the D2D UE that performs only the D2D DISCOVERY (transmission/reception) (and/or the D2D UE performing only the D2D COMMUNICATION (transmission/reception)). The proposed schemes described above may be defined to be limited to only a situation where only D2D DISCOVERY is supported (set) (and/or only D2D COMMUNICATION is supported or set). The proposed schemes described above may be defined to be limited only to a situation where the D2D DISCOVERY SIGNAL reception operation is performed using in the other (UL) CARRIER having the INTER-FREQUENCY (and/or a situation where the D2D DISCOVERY SIGNAL reception operation is performed using the other INTER-PLMN-based (UL) CARRIER). The proposed schemes described above may be defined to be limited to the OUTBAND D2D RELAY operation (and/or the INBAND D2D RELAY operation). The above-described proposed schemes may be defined to be limited to a situation where DRUE #N transmits D2D DISCOVERY-related (and/or COMMUNICATION related) SSS, and/or PSBCH (related to RELAY communication) using the CARRIER #Y. In addition, the proposed schemes described above may also be applied to a situation where a D2D UE performing a general D2D communication (not a D2D RELAY operation) transmits D2D DISCOVERY-related (and/or D2D COMMUNICATION related) SSS and/or PSBCH (and/or PSCCH and/or PSSCH and/or PSDCH transmission) using the CARRIER #Y. Also, the above-described proposed schemes may be defined to be limited to a situation where the D2D operation is performed using a non-primary carrier rather than a primary carrier. In addition, the above-described proposed schemes may be defined to be limited to a situation where there is no active serving cell using the carrier on which the D2D operation is performed (or when there is no cell to be detected).

Figure 15:
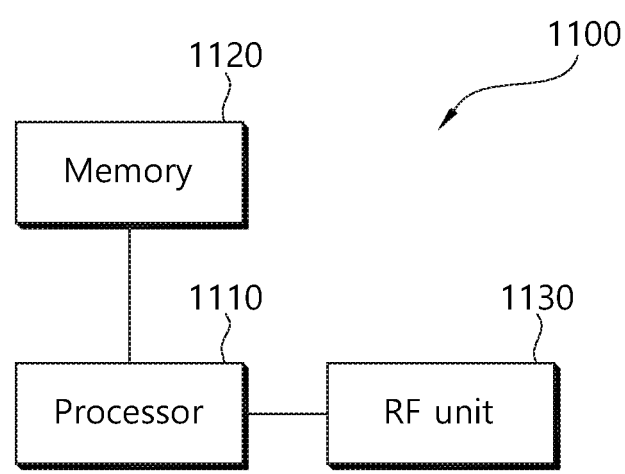
FIG. 15 is a block diagram illustrating the user device in which an embodiment of the present invention is implemented.

FIG. 15 is a block diagram illustrating the user device in which an embodiment of the present invention is implemented.

Referring to FIG. 15, the user device 1100 includes a processor 1110, a memory 1120, and a radio frequency unit 1130. Processor 1110 implements the proposed functionality, process and/or method as set forth herein. For example, the processor 1110 may receive measurement carrier (MEA_CARRIER) indication information indicating one downlink carrier used for downlink measurement and synchronization for D2D operation, and may use one downlink carrier indicated by the measurement carrier (MEA_CARRIER) indication information to perform downlink measurement and synchronization for the D2D operation. In addition, the processor 1110 may be configured to apply frequency synchronization based on a primary cell at a first frequency, to apply time synchronization on a non-serving cell at a second frequency to intend to perform a D2D operation, and then to perform the D2D operation based on the frequency synchronization and the time synchronization.

The RF unit 1130 is connected to the processor 1110 to transmit and receive radio signals.

The processor may comprise an application-specific integrated circuit (ASIC), other chipset, logic circuitry and/or data processing device. The memory may include read-only memory (ROM), random access memory (RAM), flash memory, memory cards, storage media, and/or other storage devices. The RF unit may include a baseband circuit for processing the radio signal. When the embodiment is implemented in software, the above-described techniques may be implemented with modules (processes, functions, and so on) that perform the functions described above. The module may be stored in the memory and may be executed by the processor. The memory may be internal or external to the processor, and may be coupled to the processor by various well known means.

What is claimed is:

1. A method of transmitting a device-to-device (D2D) discovery signal in a wireless communication system, the method performed by a user equipment (UE) and comprising:
   receiving, from a base station on a first carrier having a first frequency, D2D configuration information, the D2D configuration information including reference carrier information; and
   based on the D2D configuration information, transmitting, on a second carrier having a second frequency, the D2D discovery signal,
   wherein the second carrier and second frequency are different from the first carrier and the first frequency, respectively,
   wherein the reference carrier information indicates a third carrier different from the second carrier and having a third frequency different from the second frequency,
   wherein the third carrier is one of plural carriers used for the communication between the UE and the base station, the plural carriers further including the first carrier, and
   wherein the third carrier is used as reference for downlink measurements and synchronization related to transmission of D2D discovery signal on the second carrier.

2. The method of claim 1, wherein the third carrier is a carrier linked to the second carrier via system information.

3. The method of claim 1, wherein the third carrier is a carrier not linked to the second carrier via system information.

4. The method of claim 1, wherein the second carrier is configured separately from the first carrier.

5. The method of claim 1, wherein the third carrier is the first carrier.

6. The method of claim 1, wherein the third carrier is different from the first carrier.

7. A user equipment (UE) comprising:
a transceiver for transmitting and receiving a radio signal; and
a processor coupled to the transceiver, wherein the processor is configured to:
receive, from a base station on a first carrier having a first frequency, D2D configuration information, the D2D configuration information including reference carrier information; and
based on the D2D configuration information, transmit, on a second carrier having a second frequency, the D2D discovery signal,
wherein the second carrier and second frequency are different from the first carrier and the first frequency, respectively,
wherein the reference carrier information indicates a third carrier different from the second carrier and having a third frequency different from the second frequency,
wherein the third carrier is one of plural carriers used for the communication between the UE and the base station, the plural carriers further including the first carrier, and
wherein the third carrier is used as reference for downlink measurements and synchronization related to transmission of D2D discovery signal on the second carrier.

8. The UE of claim 7, wherein the third carrier is a carrier linked to the second carrier via system information.

9. The UE of claim 7, wherein the third carrier is a carrier not linked to the second carrier via system information.

10. The UE of claim 7, wherein the second carrier is configured separately from the first carrier.

11. The UE of claim 7, wherein the third carrier is the first carrier.

12. The UE of claim 7, wherein the third carrier is different from the first carrier.

* * * * *